United States Patent [19]
Hanson

[11] Patent Number: 5,123,252
[45] Date of Patent: Jun. 23, 1992

[54] METHOD OF OPERATING A TRANSPORT REFRIGERATION UNIT

[75] Inventor: Jay L. Hanson, Bloomington, Minn.

[73] Assignee: Thermo King Corporation, Minneapolis, Minn.

[21] Appl. No.: 728,463

[22] Filed: Jul. 11, 1991

[51] Int. Cl.$^5$ .............................................. F25B 41/00
[52] U.S. Cl. .......................................... 62/89; 62/126; 62/213; 165/12; 236/94
[58] Field of Search ................ 236/78 D, 94; 165/12; 62/89, 126, 213

[56] References Cited

U.S. PATENT DOCUMENTS

| | | | |
|---|---|---|---|
| 3,973,618 | 8/1976 | Naley et al. | 165/27 |
| 4,535,598 | 8/1985 | Mount | 62/126 |
| 4,569,476 | 2/1986 | Watabe | 236/47 |
| 4,653,280 | 3/1987 | Hansen et al. | 62/127 |
| 4,663,725 | 5/1987 | Truckenbrod et al. | 364/505 |
| 4,723,703 | 2/1988 | Thompson | 236/94 X |
| 4,918,932 | 4/1990 | Gustafson et al. | 62/89 |
| 4,977,751 | 12/1990 | Hanson | 62/81 |
| 4,977,752 | 12/1990 | Hanson | 62/115 |
| 5,042,265 | 8/1991 | Baldwin et al. | 236/94 X |

*Primary Examiner*—William E. Wayner
*Attorney, Agent, or Firm*—D. R. Lackey

[57] ABSTRACT

A method of operating a transport refrigeration unit with microprocessor based control. The microprocessor automatically selects an operative control algorithm, according to system configuration, with each algorithm having one or more operating conditions. Return air and discharge air temperature sensors provide inputs to the microprocessor. First, second and third sets of look-up tables are accessed by the microprocessor to determine which conditions are in the selected algorithm, and the high and low trip points of each condition. The first set of tables is accessed when the return air sensor is functional, the second set is accessed when the discharge air sensor is functional and the discharge air sensor is not, and the third set is accessed when both the return air and the discharge air sensors are not functional and the conditioned load is frozen. Failure of both sensors when the load is fresh shuts the unit down.

9 Claims, 27 Drawing Sheets

FIG. 6A — LOW TRIP POINTS USING RETURN AIR SENSOR

294 / 296

CONDITIONS

| | ALGORITHM | HCN | HCI | HCI12 | LCN | LCI | LCI8 | LCI12 | LCM | LCHG | LHM | LHI | LHI8 | LHN | HHI | HHN | NULLDC | NULLDH | NULLEC | NULLEH |
|---|---|---|---|---|---|---|---|---|---|---|---|---|---|---|---|---|---|---|---|
| I (252) | ENGINE CYCLE SP>24 | +5.0 | +3.5 | | | 0.0 | | | | | | -6.8 | -6.8 | | -6.8 | MAX | -3.5 | | | |
| II (254) | ENGINE CYCLE SP<24 | +5.0 | +3.5 | 0.0 | | | 0.0 | 0.0 | | | | FORCED TRIP | | MAX | | | MAX | MAX | | |
| III (274) | ELECTRIC CYCLE SP>24 | | | | +5.0 | 0.0 | | | | | | -6.8 | | | | | | | -3.4 | -3.4 |
| IV (276) | ELECTRIC CYCLE SP<24 | | | | +5.0 | 0.0 | | | | | | | | MAX | | | | | MAX | |
| V (260) | ENGINE CONT. W/MOD. SP>24 | +9.9 | | | +9.9 | | +3.5 | | +0.9 | 0.0 | -9.0 | MAX | | -9.9 | | MAX | | | | |
| VI (266) | ENGINE CONT. W/MOD. SP<24 | +5.0 | +3.5 | | | 0.0 | | | | | | | | | | | | | | |
| VII (282) | ELECTRIC CONT. W/MOD. SP>24 | | | | +9.9 | | +3.5 | | +0.9 | 0.0 | -9.0 | | | | | | | | | |
| VIII (288) | ELECTRIC CONT. W/MOD. SP<24 | | | | +5.0 | 0.0 | +3.5 | | | | | | | MAX | | MAX | | | MAX | |
| IX (262) | ENGINE CONT. SP>24 | +5.0 | +3.5 | | | 0.0 | | | | | | -3.4 | -6.8 | | -6.8 | MAX | | | | |
| X (268) | ENGINE CONT. SP<24 | +5.0 | +3.5 | | | 0.0 | | | | | | MAX | | MAX | | | | | | |
| XI (284) | ELECTRIC CONT. SP>24 | | | | +5.0 | 0.0 | | | | | | -6.8 | | | | | | | | MAX |
| XII (290) | ELECTRIC CONT. SP<24 | | | | +5.0 | 0.0 | | | | | | | | MAX | | | | | | MAX |

FIG. 6B

HIGH TRIP POINTS USING RETURN AIR SENSOR
CONDITIONS

| | ALGORITHM | HCN | HC1 | HCI12 | LCN | LCI | LCI8 | LCI12 | LCM | LCHG | LHM | LHI | LH18 | LHN | HHI | HHN | NMLOC | NMLOH | NMLEC | NMLEH |
|---|---|---|---|---|---|---|---|---|---|---|---|---|---|---|---|---|---|---|---|---|
| I (252) | ENGINE CYCLE SP>24 | +MAX. | +8.5 | | | | | | | | | +1.7 | +1.7 | | -1.7 | -5.0 | | | +5.1 | +5.1 |
| II (254) | ENGINE CYCLE SP<24 | +MAX. | +8.5 | +8.5 | | | +8.5 | +8.5 | | | | FORCED TRIP | | | | | +5.1 | +5.1 | | |
| III (274) | ELECTRIC CYCLE SP>24 | | | | +MAX. | +8.5 | | | | | | 0.0 | | | | | | | | |
| IV (276) | ELECTRIC CYCLE SP<24 | | | | +MAX. | +8.5 | | | | | | | | -5.0 | | | | | +5.1 | |
| V (260) | ENGINE CONT. W/MOD. SP>24 | +MAX. | | | +10.9 | | +8.5 | | +9.9 | +9.9 | +0.9 | | | | | | | | | |
| VI (266) | ENGINE CONT. W/MOD. SP<24 | +MAX. | +8.5 | | | +5.1 | | | | | | +1.7 | | -9.0 | | | | | | |
| VII (282) | ELECTRIC CONT. W/MOD. SP>24 | | | | +MAX. | | | | +9.9 | +9.9 | +0.9 | | | -9.0 | | | | | | |
| VIII (288) | ELECTRIC CONT. W/MOD. SP<24 | | | | +MAX. | +8.5 | | | | | | | | | | | | +5.1 | | |
| IX (262) | ENGINE CONT. SP>24 | +MAX. | +8.5 | | | +5.1 | +8.5 | | | | | +1.7 | -1.7 | | -1.7 | -5.0 | | | | |
| X (268) | ENGINE CONT. SP<24 | +MAX. | +8.5 | | | +5.1 | +8.5 | | | | | +1.7 | | | | | | | | |
| XI (284) | ELECTRIC CONT. SP>24 | | | | +MAX. | +8.5 | | | | | | +1.7 | | -5.0 | | | | | +5.1 | |
| XII (290) | ELECTRIC CONT. SP<24 | | | | +MAX. | +8.5 | | | | | | | | | | | | | +5.1 | |

POTENTIAL NEXT LOW USING RETURN AIR SENSOR
CONDITIONS
294
300

| | ALGORITHM | HCN | HCI | HCI12 | LCN | LCI | LCI8 | LCI12 | LCM | LCHG | LHM | LHI | LHI8 | LHN | HHI | HHN | NULDC | NULDH | NULEC | NULEH |
|---|---|---|---|---|---|---|---|---|---|---|---|---|---|---|---|---|---|---|---|---|
| 252 | I — ENGINE CYCLE SP>24 | HCI | LCI | | | NULDC | | | | | | HHN | HHN | | HHN | NULDC | LHI8 | | | |
| 254 | II — ENGINE CYCLE SP<24 | HCI | LCI12 | NULDC | | | NULDC | NULDC | | | | | | | | | | LHI8 | LHI | |
| 274 | III — ELECTRIC CYCLE SP>24 | | | | LCI | NULEC | | | | | | LHN | | LHN | | | | | LHI | LHI |
| 276 | IV — ELECTRIC CYCLE SP<24 | | | | LCI | NULEC | | | | | | | | | | | | | NULEC | |
| 260 | V — ENGINE CONT. W/MOD. SP>24 | LCM | | | LCM | | | | LCHG | LHM | LHN | | | LHN | | HHN | | | | |
| 266 | VI — ENGINE CONT. W/MOD. SP<24 | HCI | LCI | | | LHI | LCI | | | | | LHI | | | | | | | | |
| 282 | VII — ELECTRIC CONT. W/MOD. SP>24 | | | | LCM | | LCI | | LCHG | LHM | LHN | | | | LHI | | | | | |
| 288 | VIII — ELECTRIC CONT. W/MOD. SP<24 | | | | LCI | NULEC | | | | | | | | | | | | | NULEC | |
| 262 | IX — ENGINE CONT. SP>24 | HCI | LCI | | | LHI | LCI | | | | | LHI8 | HHN | | HHN | | | | | |
| 268 | X — ENGINE CONT. SP<24 | HCI | LCI | | | LHI | LCI | | | | | LHI | | | | | | | | |
| 284 | XI — ELECTRIC CONT. SP>24 | | | | LCI | LHI | | | | | | LHN | | LHN | | | | | | |
| 290 | XII — ELECTRIC CONT. SP<24 | | | | LCI | NULEC | | | | | | | | | | | | | NULEC | |

FIG. 6D

POTENTIAL NEXT HIGH WITH RETURN AIR SENSOR CONDITIONS — 294

| | ALGORITHM | HCN | HCI | HCI12 | LCN | LCI | LC18 | LCI12 | LCM | LCHG | LHM | LHI | LHI18 | LHN | HHI | HHN | NULLDC | NULLDH | NULLEC | NULLEH |
|---|---|---|---|---|---|---|---|---|---|---|---|---|---|---|---|---|---|---|---|
| I (252) | ENGINE CYCLE SP>24 | HCN | HCN | | | | | | | | | | NULLDH | | LHI | HHI | | | LCI | LCI |
| II (254) | ENGINE CYCLE SP<24 | HCN | HCN | HCN | | | HCN | HCN | | | | NULLDH | | | | | LCI8 | LCI8 | | |
| III (274) | ELECTRIC CYCLE SP>24 | | | | LCN | LCN | HCN | | | | | NULLEH | | LHI | | | | | | |
| IV (276) | ELECTRIC CYCLE SP<24 | | | | LCN | LCN | | | | | | | | | | | | | | |
| V (260) | ENGINE CONT. W/MOD. SP>24 | HCN | | | HCN | | | | LCN | | | | | LHM | | | | | | |
| VI (266) | ENGINE CONT. W/MOD. SP<24 | HCN | HCN | | LCN | LCI8 | HCN | | LCN | LCHG | | LCI | | | | | | | | |
| VII (282) | ELECTRIC CONT. W/MOD. SP>24 | | | | LCN | | | | LCN | LCHG | | | | LHM | | | | | | |
| VIII (288) | ELECTRIC CONT. W/MOD. SP<24 | | | | LCN | LCN | | | | | | | | | | | | | | |
| IX (262) | ENGINE CONT. SP>24 | HCN | HCN | | | LCI8 | HCN | | | | | LCI | LHI | | LHI | | | | LCI | |
| X (268) | ENGINE CONT. SP<24 | HCN | HCN | | LCN | LCN | HCN | | | | | LCI | | | | HHI | | | | |
| XI (284) | ELECTRIC CONT. SP>24 | | | | LCN | LCN | | | | | | LCI | | LHI | | | | | | LCI |
| XII (290) | ELECTRIC CONT. SP<24 | | | | LCN | LCN | | | | | | | | | | | | | | |

— 302

FIG. 7A — LOW TRIP POINTS USING DISCHARGE AIR SENSOR

| | | ALGORITHM | HCN | HCI12 | HCI | LCN | LCI | LCI8 | LCI12 | LCM | LCHG | LHM | LHI | LHI8 | LHN | HHI | HHN | MULDC | MULDH | MULE | CNULL | EH |
|---|---|---|---|---|---|---|---|---|---|---|---|---|---|---|---|---|---|---|---|---|---|---|
| 252 | I | ENGINE CYCLE SP>24 | -8.5 | | | | -12.0 | -12.0 | | | | | -6.8 | -6.8 | | | MAX. | -3.5 | -3.5 | | | |
| 254 | II | ENGINE CYCLE SP<24 | -2.5 | -6.0 | | | -6.0 | -6.0 | -6.0 | | | | | | | | | | | | | |
| 274 | III | ELECTRIC CYCLE SP>24 | | | | -8.0 | | | | | | | | | MAX. | | | | | 0.0 | 0.0 | |
| 276 | IV | ELECTRIC CYCLE SP<24 | | | | -6.0 | | | | | | | | | | | MAX. | | | | | |
| 260 | V | ENGINE CONT. W/MOD. SP>24 | -8.5 | | | | -12.0 | -12.0 | | | | | -15.5 | -15.5 | MAX. | | MAX. | | | | | |
| 266 | VI | ENGINE CONT. W/MOD. SP<24 | -2.5 | -6.0 | | | -6.0 | -6.0 | -6.0 | | | | | | | | | | | | | |
| 282 | VII | ELECTRIC CONT. W/MOD. SP>24 | | | | -8.0 | | | | | | | | | MAX. | | | | | | MAX. | |
| 288 | VIII | ELECTRIC CONT. W/MOD. SP<24 | | | | -6.0 | | | | | | | | | | | MAX. | | | | | |
| 262 | IX | ENGINE CONT. SP>24 | -8.5 | | | | -12.0 | -12.0 | | | | | -15.5 | -15.5 | | | MAX. | | | | | |
| 268 | X | ENGINE CONT. SP<24 | -2.5 | -6.0 | | | -6.0 | -6.0 | -6.0 | | | | | | | | | | | | | |
| 284 | XI | ELECTRIC CONT. SP>24 | | | | -8.0 | | | | | | | | | MAX. | | | | | | MAX. | |
| 290 | XII | ELECTRIC CONT. SP<24 | | | | -6.0 | | | | | | | | | | | MAX. | | | | | |

306 — CONDITIONS
304

FIG. 7B

HIGH TRIP POINTS USING DISCHARGE AIR SENSOR 304

CONDITIONS 308

| | ALGORITHM | HCN | HC1 | HCI12 | LCN | LCI | LCI8 | LCI12 | LCM | LCHG | LHM | LHI | LHI8 | LHN | HHI | HHN | MMUDC | MMUDMMN | MMULECMMULEH |
|---|---|---|---|---|---|---|---|---|---|---|---|---|---|---|---|---|---|---|
| 252 | I — ENGINE CYCLE SP>24 | +MAX. | | | | +8.5 | +8.5 | | | | | +9.7 | +9.7 | | | +6.3 | +5.1 | +5.1 | |
| 254 | II — ENGINE CYCLE SP<24 | | | +MAX. | | | +8.5 | +8.5 | | | | | | | | | | +5.1 | |
| 274 | III — ELECTRIC CYCLE SP>24 | | | | +MAX. | | | | | | | | | | | | | | |
| 276 | IV — ELECTRIC CYCLE SP<24 | | | | +MAX. | | | | | | | | | | | | | | |
| 260 | V — ENGINE CONT. W/MOD. SP>24 | +MAX. | | | | +13.1 | +13.1 | | | | | +9.7 | +9.7 | +7.7 | | +6.3 | | | |
| 266 | VI — ENGINE CONT. W/MOD. SP<24 | +MAX. | | | | +9.1 | +9.1 | | | | | | | +5.7 | | | | | |
| 282 | VII — ELECTRIC CONT. W/MOD. SP>24 | | | | +MAX. | | | | | | | | | +7.7 | | | | +5.1 | |
| 288 | VIII — ELECTRIC CONT. W/MOD. SP<24 | | | | +MAX. | | | | | | | | | | | | | | |
| 262 | IX — ENGINE CONT. SP>24 | +MAX. | | | | +13.1 | +13.1 | | | | | +9.7 | +9.7 | +5.7 | | +6.3 | | +5.1 | |
| 268 | X — ENGINE CONT. SP<24 | +MAX. | | | | +9.1 | +9.1 | | | | | | | +7.7 | | | | | |
| 284 | XI — ELECTRIC CONT. SP>24 | | | | +MAX. | | | | | | | | | +5.7 | | | | | |
| 290 | XII — ELECTRIC CONT. SP<24 | | | | +MAX. | | | | | | | | | +7.7 | | | | +5.1 | |

FIG. 7C

POTENTIAL NEXT LOW USING DISCHARGE AIR SENSOR CONDITIONS — 304

| | ALGORITHM | HCN | HCI | HCI12 | LCN | LCI | LCI8 | LCI12 | LCM | LCHG | LHM | LHI | LHI8 | LHN | HHI | HHN | NULLDC | NULLDH | NULLEC | NULLEH |
|---|---|---|---|---|---|---|---|---|---|---|---|---|---|---|---|---|---|---|---|---|
| 252 | I — ENGINE CYCLE SP>24 | LCI | | | | | | | | | | | | | | | | | | |
| 254 | II — ENGINE CYCLE SP<24 | LCI12 | | NULLDC | | | | | | | | | | | | HHN | LHI8 | LHI8 | LHN | LHN |
| 274 | III — ELECTRIC CYCLE SP>24 | | | | NULLEC | | | | | | | | | | | | | | | |
| 276 | IV — ELECTRIC CYCLE SP<24 | | | | NULLEC | NULLDC | NULLDC | | | | | | | | | | | | NULLCH | |
| 260 | V — ENGINE CONT. W/MOD. SP>24 | LCI | | | | LHI8 | LHI8 | | | | | HHN | HHN | LHN | | | | | | |
| 266 | VI — ENGINE CONT. W/MOD. SP<24 | LCI | | | | LHN | LHN | | | | | | | | | | | | | |
| 282 | VII — ELECTRIC CONT. W/MOD. SP>24 | | | | LHN | | | | | | | | | LHN | | | | | | |
| 288 | VIII — ELECTRIC CONT. W/MOD. SP<24 | | | | NULLEC | | | | | | | | | | | | | | NULLCH | |
| 262 | IX — ENGINE CONT. SP>24 | LCI | | | | LHI8 | LHI8 | | | | | HHN | HHN | LHN | | | | | | |
| 268 | X — ENGINE CONT. SP<24 | LCI | | | | LHN | LHN | | | | | | | | | | | | | |
| 284 | XI — ELECTRIC CONT. SP>24 | | | | LHN | | | | | | | | | LHN | | | | | | |
| 290 | XII — ELECTRIC CONT. SP<24 | | | | NULLEC | | | | | | | | | | | | | | | NULLCH |

POTENTIAL NEXT HIGH USING DISCHARGE AIR SENSOR 304
CONDITIONS

| | ALGORITHM | HCN | HCI | HC112 | LCN | LCI | LC18 | LC112 | LCM | LCHG | LHM | LHI | LH18 | LHN | HHI | HHN | NULDC | NULDH | NULEC | NULLEH |
|---|---|---|---|---|---|---|---|---|---|---|---|---|---|---|---|---|---|---|---|---|
| I | ENGINE CYCLE SP>24 | HCN | | | | | | | | | | NULDH | NULLEH | | | | | | | |
| II | ENGINE CYCLE SP<24 | HCN | | HC112 | | HCN | HCN | HCN | | | | | | | | | | LCI8 | LCI8 | LCN |
| III | ELECTRIC CYCLE SP>24 | | | | LCN | | | | | | | | | | | | | | LCI8 | LCN |
| IV | ELECTRIC CYCLE SP<24 | | | | LCN | | | | | | | | | | | | | | LCN | |
| V | ENGINE CONT. W/MOD. SP>24 | HCN | | | | HCN | HCN | | | | | | LCI8 | LCI8 | NULEH | | | | | |
| VI | ENGINE CONT. W/MOD. SP<24 | HCN | | | | HCN | HCN | | | | | | | | LCI8 | LHI | | | | |
| VII | ELECTRIC CONT. W/MOD. SP>24 | | | | LCN | | | | | | | | | LCN | | | | | | LCN |
| VIII | ELECTRIC CONT. W/MOD. SP<24 | | | | LCN | | | | | | | | | | | | | | | |
| IX | ENGINE CONT. SP>24 | HCN | | | | HCN | HCN | | | | | | LCI8 | LCI8 | | LHI | | | | |
| X | ENGINE CONT. SP<24 | HCN | | | | HCN | HCN | | | | | | | LCI8 | | | | | | |
| XI | ELECTRIC CONT. SP>24 | | | | LCN | | | | | | | | | LCN | | | | | | |
| XII | ELECTRIC CONT. SP<24 | | | | LCN | | | | | | | | | | | | | | | LCN |

LOW TRIP POINTS—BOTH SENSORS FAILED
CONDITIONS

| | ALGORITHM | HCN | HCI | HCI12 | LCN | LCI | LCI8 | LCI12 | LCM | LCHG | LHM | LHI | LHI8 | LHN | HHI | HHN | NULLDC | NULLDH | NULLEC | NULLEH |
|---|---|---|---|---|---|---|---|---|---|---|---|---|---|---|---|---|---|---|---|
| 252 — I | ENGINE CYCLE SP > 24 | | | | | | | | | | | | | | | | | | | |
| 254 — II | ENGINE CYCLE SP < 24 | | | | MAX. | | | | | | | | | | | | | | | |
| 274 — III | ELECTRIC CYCLE SP > 24 | | | | | | | | | | | | | | | | | | | |
| 276 — IV | ELECTRIC CYCLE SP < 24 | | | | MAX. | | | | | | | | | | | | | | | |
| 260 — V | ENGINE CONT. W/MOD. SP > 24 | | | | | | | | | | | | | | | | | | | |
| 266 — VI | ENGINE CONT. W/MOD. SP < 24 | | | | MAX. | | | | | | | | | | | | | | | |
| 282 — VII | ELECTRIC CONT. W/MOD. SP > 24 | | | | | | | | | | | | | | | | | | | |
| 288 — VIII | ELECTRIC CONT. W/MOD. SP < 24 | | | | MAX. | | | | | | | | | | | | | | | |
| 262 — IX | ENGINE CONT. SP > 24 | | | | | | | | | | | | | | | | | | | |
| 268 — X | ENGINE CONT. SP < 24 | | | | MAX. | | | | | | | | | | | | | | | |
| 284 — XI | ELECTRIC CONT. SP > 24 | | | | | | | | | | | | | | | | | | | |
| 290 — XII | ELECTRIC CONT. SP < 24 | | | | MAX. | | | | | | | | | | | | | | | |

HIGH TRIP POINTS—BOTH SENSORS FAILED
CONDITIONS _314_

_318_

| | ALGORITHM | HCN | HCI | HCI12 | LCN | LCI | LCI18 | LCI12 | LCM | LCHG | LHM | LHI | LHI8 | LHN | HHI | HHN | NULDC | NULDHN | NULLEC | NULLEH |
|---|---|---|---|---|---|---|---|---|---|---|---|---|---|---|---|---|---|---|---|---|
| 252 | I | ENGINE CYCLE SP > 24 | | | | | | | | | | | | | | | | | | |
| 254 | II | ENGINE CYCLE SP < 24 | | | | ±MAX. | | | | | | | | | | | | | | |
| 274 | III | ELECTRIC CYCLE SP > 24 | | | | | | | | | | | | | | | | | | |
| 276 | IV | ELECTRIC CYCLE SP < 24 | | | | ±MAX. | | | | | | | | | | | | | | |
| 260 | V | ENGINE CONT. W/MOD. SP > 24 | | | | | | | | | | | | | | | | | | |
| 266 | VI | ENGINE CONT. W/MOD. SP < 24 | | | | ±MAX. | | | | | | | | | | | | | | |
| 282 | VII | ELECTRIC CONT. W/MOD. SP > 24 | | | | | | | | | | | | | | | | | | |
| 288 | VIII | ELECTRIC CONT. W/MOD. SP < 24 | | | | ±MAX. | | | | | | | | | | | | | | |
| 262 | IX | ENGINE CONT. SP > 24 | | | | | | | | | | | | | | | | | | |
| 268 | X | ENGINE CONT. SP < 24 | | | | ±MAX. | | | | | | | | | | | | | | |
| 284 | XI | ELECTRIC CONT. SP > 24 | | | | | | | | | | | | | | | | | | |
| 290 | XII | ELECTRIC CONT. SP < 24 | | | | ±MAX. | | | | | | | | | | | | | | |

FIG. 8C

POTENTIAL NEXT HIGH-BOTH SENSORS FAILED
POTENTIAL NEXT LOW-BOTH SENSORS FAILED
CONDITIONS

| | ALGORITHM | HCN | HC1 | HC112 | LCN | LC1 | LC18 | LCI12 | LCM | LCHG | LHM | LHI | LHI8 | LHN | HHI | HHN | NULDC | NULDH | NULLEC | NULLEH |
|---|---|---|---|---|---|---|---|---|---|---|---|---|---|---|---|---|---|---|---|---|
| I | ENGINE CYCLE SP>24 | | | | | | | | | | | | | | | | | | | |
| II | ENGINE CYCLE SP<24 | | | | LCN | | | | | | | | | | | | | | | |
| III | ELECTRIC CYCLE SP>24 | | | | | | | | | | | | | | | | | | | |
| IV | ELECTRIC CYCLE SP<24 | | | | LCN | | | | | | | | | | | | | | | |
| V | ENGINE CONT. W/MOD. SP>24 | | | | LCN | | | | | | | | | | | | | | | |
| VI | ENGINE CONT. W/MOD. SP<24 | | | | LCN | | | | | | | | | | | | | | | |
| VII | ELECTRIC CONT. W/MOD. SP>24 | | | | | | | | | | | | | | | | | | | |
| VIII | ELECTRIC CONT. W/MOD. SP<24 | | | | LCN | | | | | | | | | | | | | | | |
| IX | ENGINE CONT. SP>24 | | | | | | | | | | | | | | | | | | | |
| X | ENGINE CONT. SP<24 | | | | LCN | | | | | | | | | | | | | | | |
| XI | ELECTRIC CONT. SP>24 | | | | | | | | | | | | | | | | | | | |
| XII | ELECTRIC CONT. SP<24 | | | | LCN | | | | | | | | | | | | | | | |

METHOD OF OPERATING A TRANSPORT REFRIGERATION UNIT

TECHNICAL FIELD

The invention relates in general to transport refrigeration units, and more specifically to transport refrigeration units which have microprocessor based electrical control.

BACKGROUND ART

U.S. Pat. No. 4,663,725, which is assigned to the same assignee as the present application, discloses the use of microprocessor based refrigeration control for use with a refrigerated container, with the refrigerant compressor being driven by an electric motor. One of the features of this patent is the ability to manually select return air control or discharge air control, with a failure of the temperature sensor associated with the selected control resulting in automatically switching to the other of the two types of control. If the sensors associated with both types of control fail, the unit is shut down.

It is an object of the present invention to expand upon and improve the protective features of the aforesaid patent, while extending microprocessor control to transport refrigeration systems in which the prime mover is selectable between an internal combustion engine, such as a Diesel engine, and a stand-by electric motor.

SUMMARY OF THE INVENTION

Briefly, the present invention is a method of operating a transport refrigeration unit with microprocessor based electrical control, for controlling the temperature of a conditioned space to a selected set point temperature. The microprocessor automatically selects an operative control algorithm, from a plurality of control algorithms, according to system configuration, with each algorithm having one or more operating conditions. The determinative factors in the selection of the operative control algorithm include whether a prime mover for a refrigerant compressor is an internal combustion engine or an electric motor, whether the selected prime mover is to be operated continuously or in a cyclic mode, whether the load being conditioned is a fresh load or a frozen load, and whether or not suction line modulation has been selected.

Return air and discharge air temperature sensors are both utilized to sense the temperature of the load being conditioned, and both continuously provide inputs to the microprocessor. First, second and third sets of look-up tables are accessed by the microprocessor to determine which operating conditions are in the selected algorithm, and the high and low trip points of each condition.

The first set of look-up tables is associated with return air control. The first set is accessed when the return air sensor is functioning correctly, without regard as to whether or not the discharge air temperature sensor is functioning correctly.

The second set of look-up tables is associated with discharge air control. The second set is accessed when the discharge air sensor is functional and the return air sensor is not functioning properly.

The third set of look-up tables is not associated with either return air or discharge air control, with the purpose of the third set being to provide control options when both the return air and discharge air sensors are faulty. When the microprocessor determines that neither sensor is providing accurate information, the microprocessor looks at the selected set point temperature to determine if the load being conditioned is a fresh load or a frozen load. If the load is frozen, the third set of look-up tables is accessed to determine the parameters of the selected control algorithm. Failure of both sensors when the load being conditioned is a fresh load results in the microprocessor shutting the unit down, with an alarm code being generated to inform the operator the reason for the shut down.

BRIEF DESCRIPTION OF THE DRAWINGS

The invention will become more apparent by reading the following detailed description in conjunction with the drawings, which are shown by way of example only, wherein:

FIGS. 6A through 6D form a first set of look-up tables which are associated with return air temperature control of the transport refrigeration unit for each of the plurality of control algorithms;

FIGS. 7A through 7D form a second set of look-up tables which are associated with discharge air temperature control of the transport refrigeration unit for each of the plurality of control algorithms;

FIGS. 8A through 8C form a third set of look-up tables which are associated with control of the transport refrigeration unit when temperature sensors related to return air and discharge air temperature are both determined by the microprocessor to be faulty;

DESCRIPTION OF PREFERRED EMBODIMENTS

Figure 1:
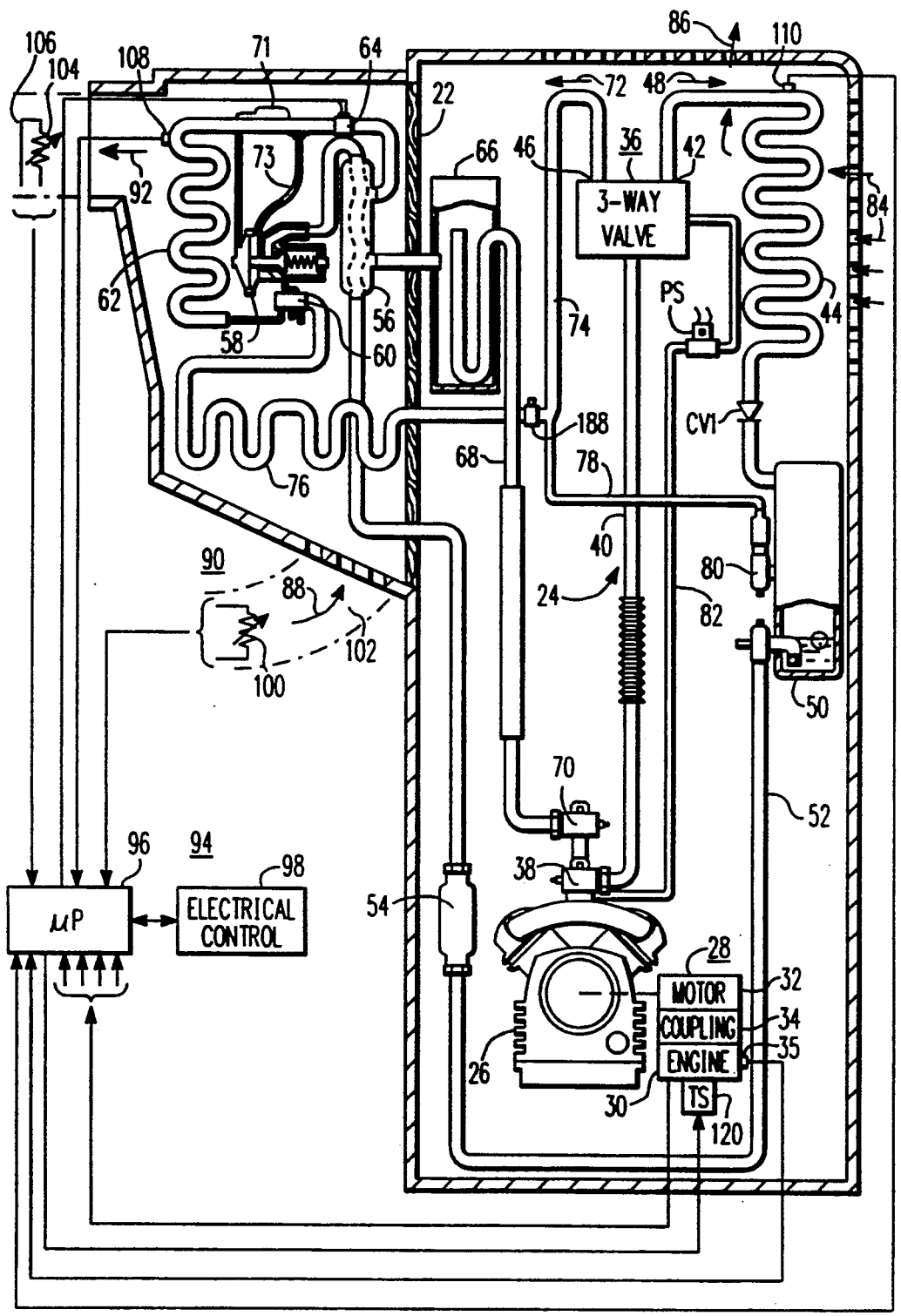
FIG. 1 is a partially block and partially schematic diagram of a refrigeration system which may be controlled by the methods of the invention.

Referring now to the drawing, and to FIG. 1 in particular, there is shown a transport refrigeration unit which may utilized the methods of the invention. Refrigeration unit 20 may be mounted on a container, truck, or trailer, such as on a wall 22 thereof, for example. Refrigeration unit 20 has a closed fluid refrigerant circuit 24 which includes a refrigerant compressor 26 driven by a prime mover arrangement 28. Prime mover arrangement 28 includes an internal combustion engine 30, and it may optionally include a stand-by electric motor 32. Engine 30 and motor 32 are coupled to compressor 26 by a suitable clutch or coupling 34 which disengages engine 30 while motor 32 is operative. A selector 35 selects one of the two prime movers and provides an output signal to identify the selection.

Discharge ports of compressor 26 are connected to an inlet port of a three-way valve 36 via a discharge service valve 38 and a hot gas line 40. The functions of three-way valve 36, which selects heating and cooling cycles, may be provided by two separate valves, if desired. Three-way valve 36 has a first output port 42, which is selected to initiate a cooling cycle, with the first output port 42 being connected to the inlet side of a condenser coil 44. Three-way valve 36 has a second outlet port 46, which is selected to initiate a heating cycle, as will be hereinafter described.

When three-way valve 36 selects the cooling cycle output port 42, it connects compressor 26 in a first refrigerant circuit 48, which in addition to condenser 44, includes a one-way condenser check valve CVI, a receiver 50, a liquid line 52, a refrigerant drier 54, a heat exchanger 56, an expansion valve 58, a refrigerant distributor 60, an evaporator coil 62, an optional controllable suction line modulation valve 64, another path through heat exchanger 56, an accumulator 66, a suction line 68, and back to a suction port of compressor 26 via a suction line service valve 70. The operative prime mover may be protected against overload by controlling modulation valve 64 to provide the function of a conventional compressor throttling valve, as taught by U.S. Pat. No. 4,977,751, which is assigned to the same assignee as the present application; or, a conventional compressor throttling valve may be disposed in suction line 68, as desired Expansion valve 58 is controlled by a thermal bulb 71 and an equalizer line 73.

When three-way valve 36 selects the heating cycle output port 46, it connects compressor 26 in a second refrigerant circuit 72. The second refrigerant circuit 72 by-passes condenser 44 and expansion valve 58, connecting the hot gas output of compressor 26 to the refrigerant distributor 60 via a hot gas line 74 and a defrost pan heater 76. A hot gas by-pass solenoid valve 77 may optionally be disposed in hot gas line 74. A by-pass pass or pressurizing line 78 connects hot gas line 74 to receiver 50 via by-pass and check valves 80, to force refrigerant from receiver 50 into an active refrigerant circuit during heating and defrost cycles.

A conduit or line 82 connects three-way valve 36 to the low side of compressor 26 via a normally closed pilot solenoid valve PS. When solenoid valve PS is deenergized and thus closed, three-way valve 18 is spring biased to select the cooling cycle output port 42. When evaporator 62 requires defrosting, and when the load being conditioned requires heat to maintain set point, pilot solenoid valve PS is energized to allow the low pressure side of compressor 26 to operate three-way valve 36 to select the heating cycle output port 46.

A condenser fan or blower (not shown) causes ambient air 84 to flow through condenser coil 44, with the resulting heated air 86 being discharged to the atmosphere. An evaporator fan or blower (not shown) draws air 88, called "return air", from a served space 90 whose air is to be conditioned, through the evaporator coil 62, and the resulting cooled or heated air 92, called "discharge air", is returned to the space 90. During an evaporator defrost cycle, the evaporator fan or blower is not operated, and a defrost air damper may be operated to close the discharge air path to the conditioned space 90.

Transport refrigeration unit 20 is controlled by microprocessor based electrical control 94 which includes a microprocessor 96 and electrical control 98. Electrical control 98 includes relays, and the like, as will be explained relative to FIGS. 2A and 2B. The microprocessor 96 receives input signals from appropriate sensors, such as from a return air temperature sensor 100 disposed in a suitable return air path 102, a discharge air temperature sensor 104 disposed in a suitable discharge air path 106, from a coil temperature sensor 108 disposed to sense the temperature of the evaporator coil 62, from a refrigerant pressure sensor (HPCO) 110 disposed on the high side of the refrigerant circuit 48, and from various engine sensors shown in FIG. 2B, such as oil level sensor 112, oil pressure sensor 114, engine coolant temperature sensor 116, and engine speed sensor 118. Microprocessor 96, among other things, controls modulation valve 64, hot gas solenoid valve 77, and a throttle or high speed solenoid 120. Other functions controlled by microprocessor 96 are shown in FIGS. 2A and 2B, and will be hereinafter described.

Figure 2A:
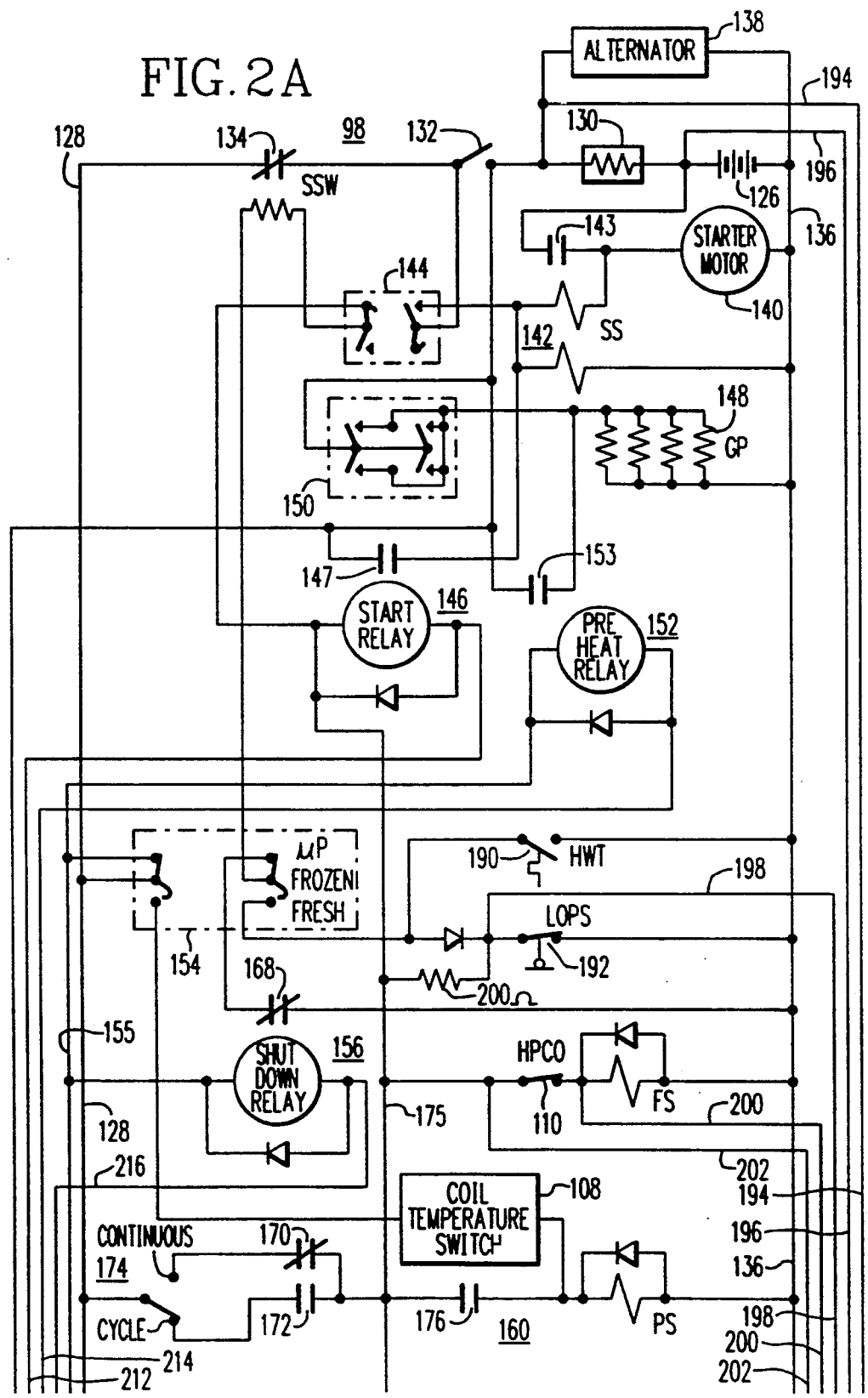
FIGS. 2A and 2B may be assembled to provide an electrical schematic diagram of microprocessor based electrical control, which aids in implementing the teachings of the invention.
Figure 2B:
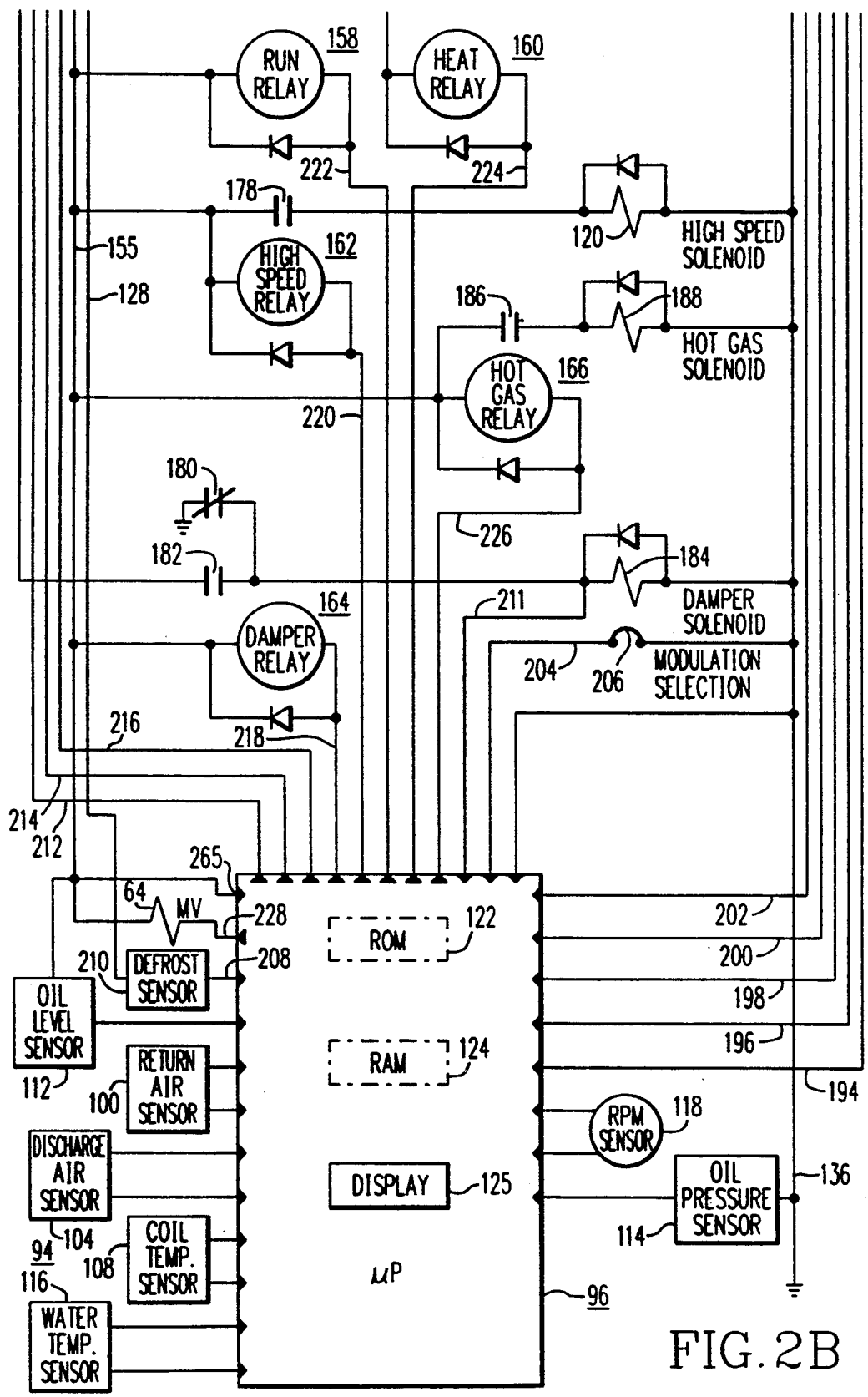

FIGS. 2A and 2B may be assembled to provide a detailed schematic diagram of microprocessor based electrical control 94, which includes microprocessor 96 and control 98. As is well known, microprocessor 96 includes a read-only memory (ROM) 122 for storing programs to be hereinafter described, and a random access memory (RAM) 124 for software timers, flags, input signals, output signals, and other values generated by the operating programs. Microprocessor 96 also includes a display 125 for displaying fault codes, system status indicating lights, and the like.

Electrical control 98 includes a battery 126 which has one side connected to a first conductor 128 via a DC shunt 130, an on-off switch 132, and normally closed contacts 134 of a protective reset switch SSW. The remaining side of battery 126 is connected to conductor 136, which is grounded. Control 98 further includes an alternator 138 driven by prime mover 28; a starter motor 140, for cranking engine 30, which is controlled by a starter solenoid 142 having associated normally open contacts 143, an ignition switch 144, and a start relay 146 having associated normally open contacts 147; and glow plug resistors (GP) 148, for pre-heating engine 30, which are controlled by a pre-heat switch 150 and by a pre-heat relay 152 which has normally open contacts 153.

Control 98 also includes a three-position switch 154 which has two banks of three terminals each comprising a center terminal and upper and lower terminals, with reference to FIG. 2A. Switch 154, in the illustrated upper position which connects the center terminal to the upper terminal, places unit 20 under control of the microprocessor 96. The upper position provides voltage from conductor 128 to a conductor 155. An intermediate position of switch 154, in which the center terminal is not connected to either the upper terminal or the lower terminal, is selected when the microprocessor 96 is not utilized and the load in the conditioned space 90 is frozen. This switch position will cause unit 20 to operate continuously in a low speed cool mode. The lower position of switch 154 is selected when the microprocessor 96 is not utilized and the load in the conditioned space is fresh. This position of switch 154 will cause unit 10 to operate continuously, cycling between heating and cooling cycles under the control of the hereinbefore mentioned coil temperature switch 108. Coil temperature switch 108 is preset to close at a predetermined coil temperature, such as 35° F., to energize the pilot solenoid PS and initiate a heating cycle, and to open at a predetermined higher temperature, such as 38° F., to de-energize pilot solenoid PS and initiate a cooling cycle.

In addition to the relays already mentioned, control 98 includes a shutdown relay 156, a run relay 158, a heat relay 160, a high speed relay 162, a defrost damper relay 164, and a hot gas relay 166. Shutdown relay 156 is normally energized, and is de-energized to shut unit 10 down via its associated set of normally-closed contacts 168 which ground the protective switch SSW and cause it to open its contacts 134. The run relay 158 has normally-closed and normally open contacts 170 and 172, respectively, connected to a mode selector switch 174 which has an input connected to conductor 128. Selector switch 174 selects either a continuous operating mode in which the prime mover 28 operates continuously, or a cycling start-stop mode, also called "cycle sentry", which includes starting and stopping the prime mover 28.

The normally-closed contacts 170 of run relay 158 are connected to the "continuous" position of selector switch 174, and the normally-open contacts 172 of run relay 158 are connected to the "cycling" position of selector switch 174. Contacts 170 or contacts 172 provide voltage to a conductor 175 from conductor 128 and selector switch 174.

Heat relay 160 has a set of normally open contacts 176 for controlling the pilot solenoid PS. High speed relay 162 has a set of normally open contacts 178 for controlling the high speed solenoid 120. Damper relay has a set of normally closed contacts 180 and a set of normally open contacts 182, connected to control a defrost damper solenoid 184. Hot gas relay 166 is provided for controlling the hot gas solenoid valve 77 via a set of normally open contacts 186, when a hot gas solenoid 77 is provided in hot gas line 74.

Control 98 also includes a engine coolant temperature switch (high water temperature −HWT) 190, which closes when the engine coolant reaches a predetermined elevated temperature, and a low oil pressure switch (LOPS) 192 which is open as long as engine pressure is normal. The closing of either switch 190 or 192 will shut unit 20 down via the manual reset switch SSW.

Microprocessor 96 senses the voltage across DC shunt 130 via conductors 194 and 196, and can thus determine the magnitude and polarity of battery current. One polarity, which will be called positive, indicates the battery 126 is being charged by alternator 138, which also indicates the prime mover 28 is running. The other polarity, i.e., negative, indicates the battery is discharging.

Microprocessor 96 also has a conductor 198 which senses the position of the low oil pressure switch 192, conductors 200 and 202 which sense the voltage level on first and second sides, respectively, of the high refrigerant cut-out switch 110, a conductor 204 which senses whether or not a modulation valve selector jumper 206 has connected conductor 204 to system ground 136, a conductor 208 which senses whether or not a defrost sensor switch 210 has operated, signifying the need for a defrost cycle, and a conductor 211 which detects voltage on the damper solenoid 184.

Microprocessor 96 has a plurality of output conductors for controlling various functions, including conductors 212, 214, 216, 218, 220, 222, 224 and 226 for respectively controlling the operation of start relay 146, pre-heat relay 152, shutdown relay 156, damper relay 164, high speed relay 162, run relay 158, heat relay 160, and hot gas relay 166. A conductor 228 is also provided for controlling the current level in the modulation valve 64.

As the microprocessor functions are described, only those necessary to understanding the invention will be described in detail. Certain of the functions shown in block form, may be described in detail and claimed in concurrently filed application Ser. Nos. 728,471, 728,665 and 728,464.

Figure 3:
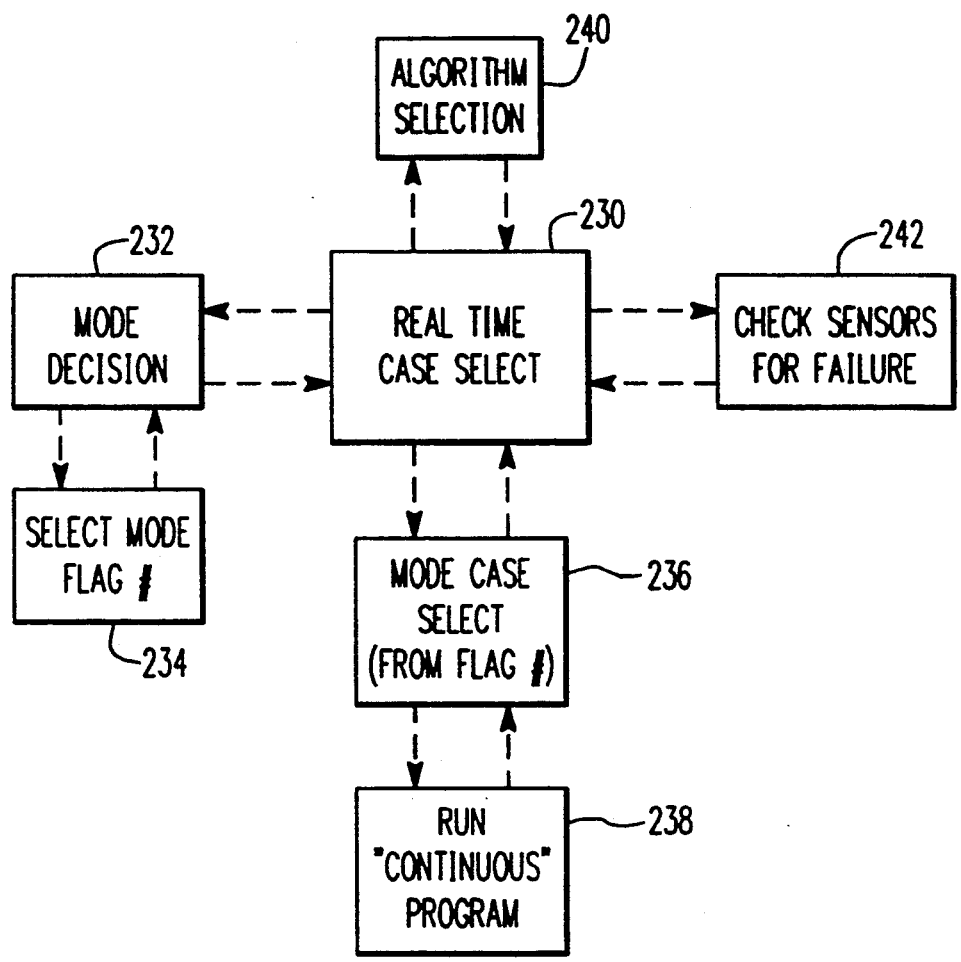
FIG. 3 is a functional block diagram which sets forth some of the functions performed by the microprocessor based control.

FIG. 3 is a block diagram which sets forth certain functions of microprocessor 96. Microprocessor 96 is time driven via a "real time case select" function 230. Among a variety of other tasks, function 230 runs a "mode decision" function 232. Function 232 starts engine 30 when an engine start flag ESF is true, and the mode decision function 232 includes a function 234 which assigns a number 1 through 6 to a mode flag MF. Function 234 assigns #5 to mode flag MF when microprocessor control is not selected, which indicates a "power down" program should be run to shut microprocessor 96 down in an orderly fashion. If microprocessor control is selected, mode flag MF is set to #6 if a pre-trip operation of unit 20 has been requested. If pre-trip has not been selected, #3 is assigned to mode flag MF if manual defrost has been selected, and #4 is assigned if a timed defrost flag is true.

If neither manual nor timed defrost are required, function 234 assigns #1 to mode flag MF if cycle sentry operation of prime mover 28 has been selected, and #2 if continuous run operation of prime mover 28 has been selected.

Figure 13:
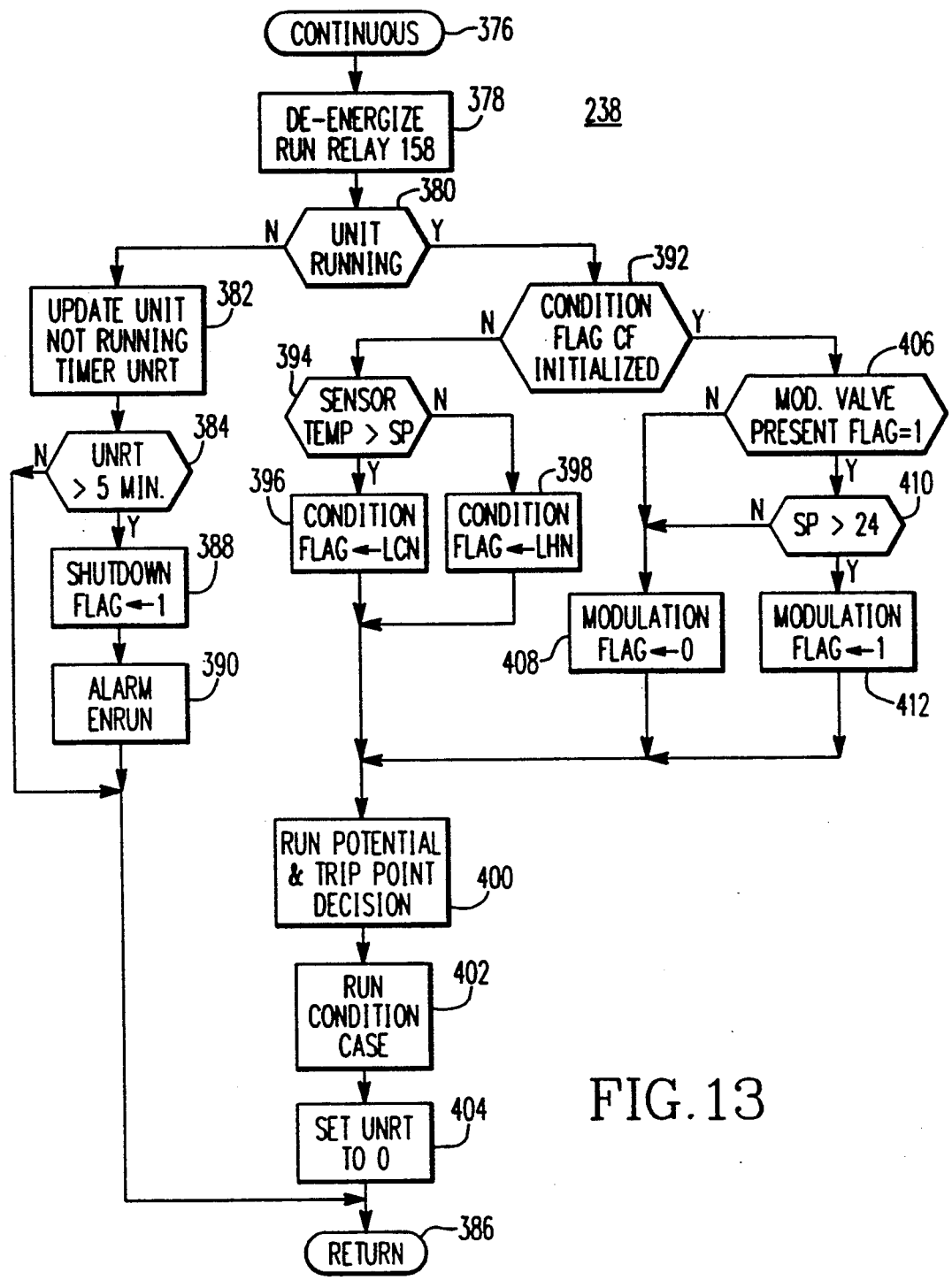
FIG. 13 is a flow chart which sets forth program steps for implementing continuous control of a refrigerant prime mover.

Real time case select function 230 then runs a mode case select function which looks at the number assigned to mode flag MF and runs a program associated with the assigned number. For example, if #2 is assigned to mode flag MF, a program "continuous" is run, as indicated at function block 238. Functions 230, 232, 234 and 236 are shown in detail in concurrently filed application Ser. No. 728,665. The subject matter of Ser. No. 728,468 is hereby incorporated into the specification of the present application by reference. A program for the "continuous" function 238 is also shown in Ser. No. 728,665, but it is also shown in FIG. 13 of the present application, as an example of implementing certain teachings of the invention.

The real time case select function 230 looks at the system configuration of unit 20, with the system configuration including options selected by the operator. A control algorithm tailored for the specific system configuration is then selected in function 240. Function 240 is shown in detail in FIG. 4. Real time case select function 230 also runs a program function 242 which checks the various sensors for failure, with this program being set forth in FIG. 12.

Figure 4:
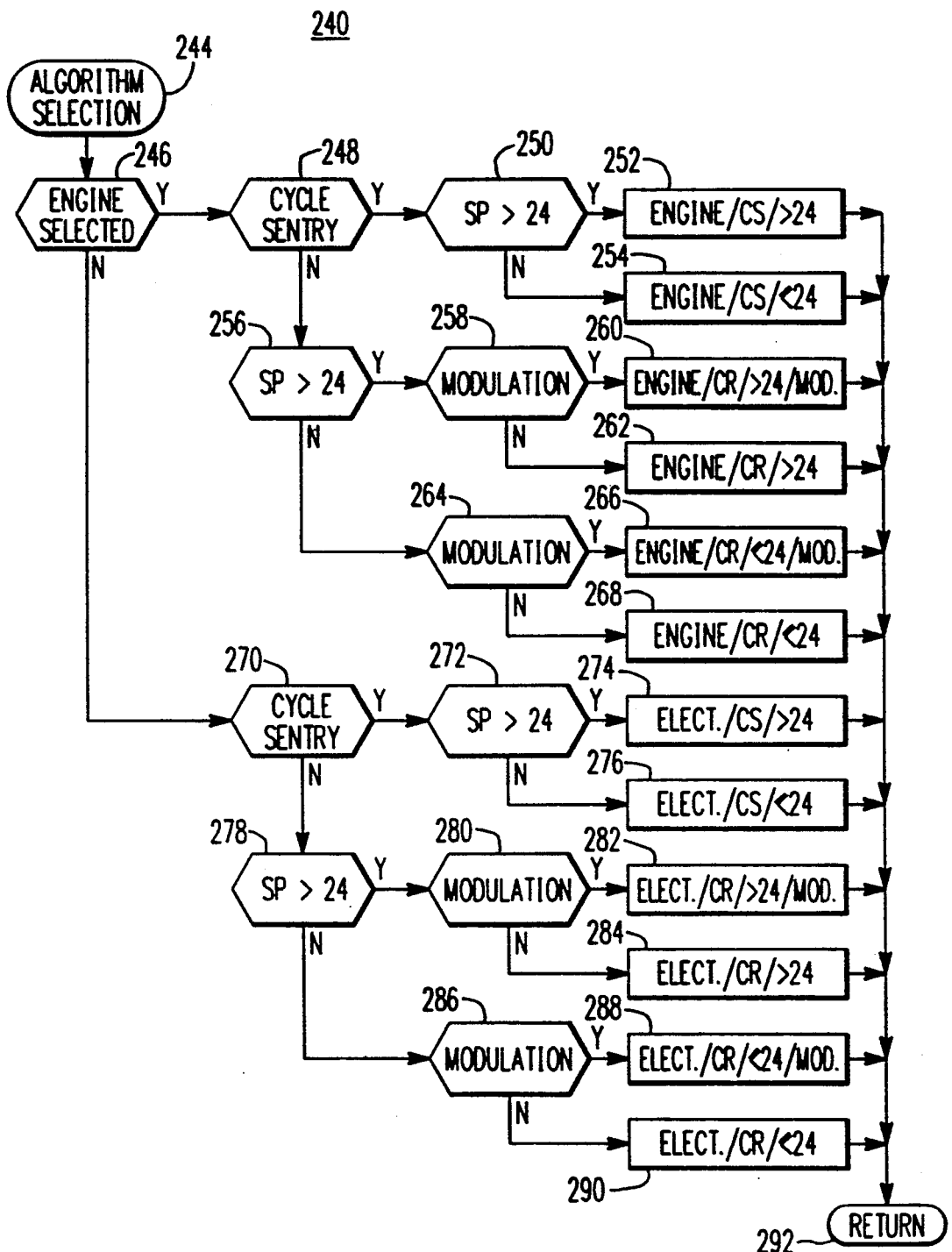
FIG. 4 is a flow chart which illustrates how a control algorithm is selected from a plurality of algorithms, utilizing the operator selected configuration of the transport refrigeration unit.

Referring now to FIG. 4, the algorithm selection function 240 is entered at 244 and step 246 checks the input from prime mover selector 35 to determine if the engine 30 or the electric motor 32 is the operative prime mover for refrigerant compressor 26. If engine 30 is selected, step 248 checks to see if the cyclic mode "cycle sentry", or the continuous mode "continuous" has been selected. If cycle sentry has been selected, step 250 checks to see if the selected set point temperature indicates a fresh load or a frozen load, such as by determining if set point is above 24° F. If the set point is above 24° F., algorithm 252 (Engine/CS/>24) is selected, which indicates the engine 30 is the prime mover, operating on cycle sentry (CS), with a fresh load (>24). If step 250 finds the set point temperature is 24° F. or below, algorithm 254 (Engine/CS/<24) is selected.

If step 248 finds the "continuous" mode has been selected, step 256 checks set point relative to 24° F. If a fresh load is indicated, step 258 checks to see if modulation jumper 206 is in place. If suction line modulation has been requested, algorithm 260 (Engine/CR/>24/-Mod) is selected, which indicates engine 30 has been selected, the continuous run (CR) mode has been selected, the load is fresh (>24), and suction line modulation has been selected (Mod). If step 258 finds modulation has not been selected, algorithm 262 (Engine/CR/>24) is selected.

If step 256 finds a frozen load, step 264 checks to see if modulation has been selected. If so, algorithm 266 (Engine/CR/<24/Mod) is selected, and if modulation has not been selected, algorithm 268 (Engine/CR/<24) is selected.

If step 246 finds electric motor 32 has been selected as the compressor prime mover, step 270 checks to see if the selected operation mode is cycle sentry or continuous run. If cycle sentry, step 272 checks set point relative to 24° F. If the set point selection indicates a fresh load, algorithm 274 (Elect/CS/>24) is selected, and if a frozen load is indicated, algorithm 276 (Elect/CS/<24) is selected.

If step 270 finds "continuous run" has been selected, step 278 checks the selected set point temperature relative to 24° F., and if a fresh load is indicated, step 280 determines if suction line modulation has been selected. If so, algorithm 282 (Elect/CR/>24/Mod) is selected, and if modulation has not been requested, algorithm 284 (Elect/CR/>24) is selected.

If step 278 finds a frozen load is indicated, step 286 checks for suction line modulation. If modulation is requested, algorithm 288 (Elect/CR/<24/Mod) is selected, and if modulation is not selected, algorithm 290 (Elect/CR/<24) is selected.

Figure 5:
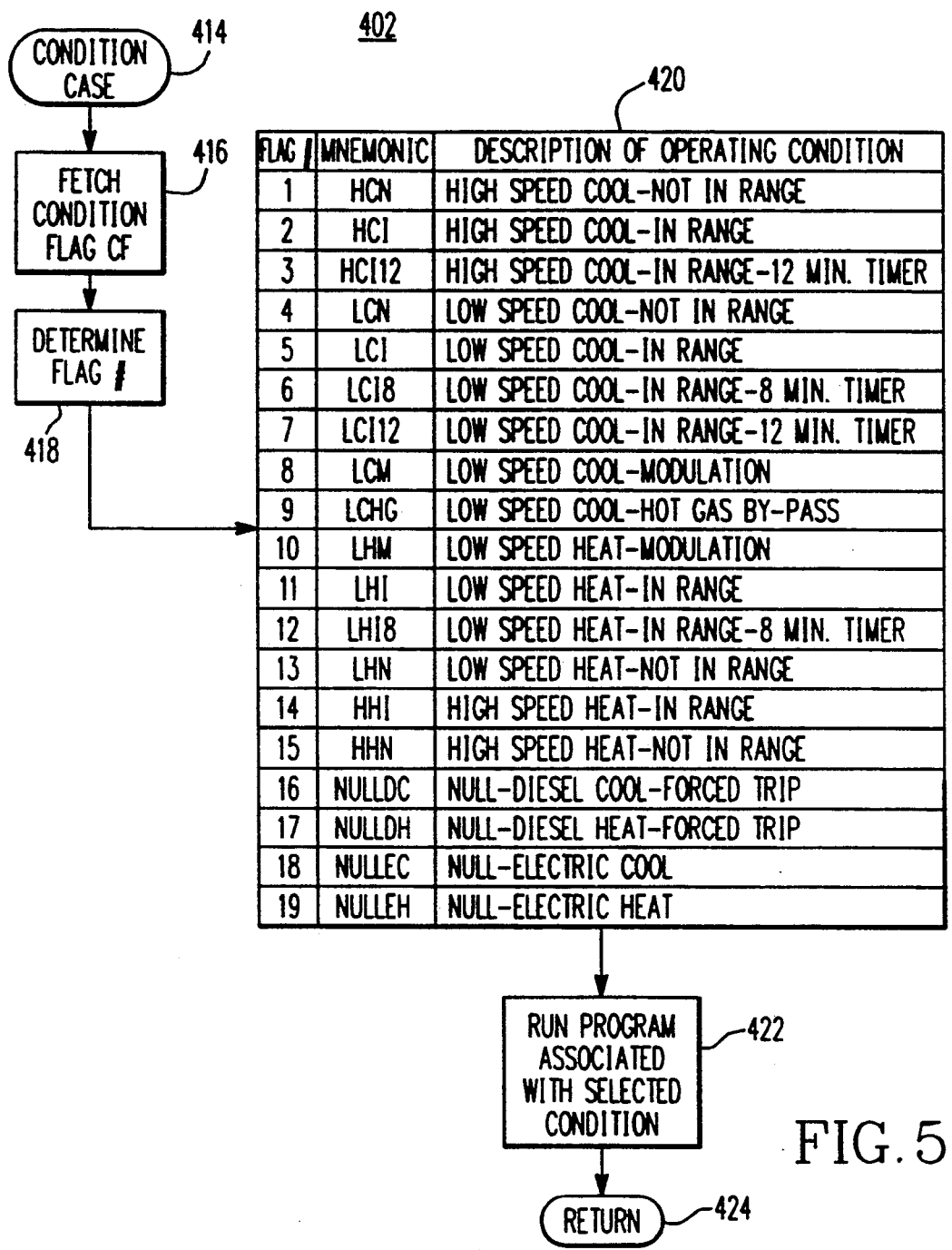
FIG. 5 is a flow chart which illustrates how various operating conditions which make up the plurality of control algorithms are determined from a flag number assigned in one or more of the operating programs of the microprocessor.

Each of the algorithms shown in FIG. 4 is made up of one or more of a plurality of operating conditions, such as 19 operating conditions, which are set forth in FIG. 5. FIG. 5 is a program "condition case", which is called by the continuous run program of FIG. 13, and by the cycle sentry program (not shown). The cycle sentry program is shown in the hereinbefore mentioned concurrently filed application Ser. No. 728,665. FIG. 5 will be described in greater detail after describing the continuous program of FIG. 13, but it is introduced at this point to show the various operating conditions which are used to construct the 12 algorithms shown in FIG. 4.

Each operating condition is associated with a condition flag CF, with condition flag CF being assigned a number from 1 through 19, with mnemonics being used to identify each operating condition. The description of each mnemonic is also set forth in FIG. 5. For example, the mnemonic HCN indicates an operating condition "high speed cool-not in range". This is used when engine 30 is the operative prime mover, to select the higher of two engine speeds, e.g., 2200 RPM, and a cooling cycle for unit 20. Mnemonic LCN, "low speed cool, not in range", indicates either the lower of two engine speeds, e.g., 1400 RPM, when engine 30 is selected; or, it indicates electric motor 32, which has only one operating speed, when electric motor 32 is selected as the prime mover.

The mnemonics starting with "NULL" are associated with cycle sentry operation, with "NULL" being a condition which is entered when unit 20 requires neither cool nor heat to satisfy set point, with the prime mover being turned off if the engine block temperature exceeds a predetermined value and if the battery charging current is below a predetermined value. In other words, the "NULL" programs make sure battery 126 is sufficiently charged, and engine 30 is sufficiently warm, before shutting engine 30 down. NULLDC indicates that the engine 30 is the prime mover, and the "null" condition is being entered from a cooling cycle. Condition NULLDH indicates engine 30 is the prime mover and the "null" condition is being entered from a heating cycle. Conditions NULLEC and NULLEH provide the same information as NULLDC and NULLDH, except indicating the prime mover is electric motor 32.

Mnemonics with a number 8 or a 12 at the end indicate that an 8 minute or a 12 minute timer is started when the operating condition is entered. If the error temperature, i.e., the difference between the temperature of the load and set point, is not reduced to a predetermined value by the time the timer expires, then another operating condition will be initiated which will be effective until a predetermined error value is reached.

The present invention utilizes first, second and third sets of look-up tables, with each set preferably having four look-up tables. A first set 294 of look-up tables, includes first, second, third and fourth look-up tables 296, 298, 300 and 302, respectively, shown in FIGS. 6A, 6B, 6C and 6D. A second set 304 of look-up tables, includes first, second, third and fourth look-up tables 306, 308, 310 and 312, respectively, shown in FIGS. 7A, 7B, 7C and 7D. A third set 314 of look-up tables, includes first and second look-up tables 316 and 318, shown in FIGS. 8A and 8B, with the third and fourth look-up tables being shown in a single table 320 set forth in FIG. 8C.

The first set 294 of look-up tables is associated with return air control of unit 20. Each of the look-up tables, in all three of the sets of look-up tables, disclose which operating conditions are in each of the twelve algorithms, with the twelve algorithms being listed on the left-hand side of each look-up table and identified with the reference numbers assigned to them in FIG. 4, as well as by Roman numerals I through XII. The mnemonics of the 19 operating conditions are listed along the top of each look-up table.

The first look-up table 296 of the first set 294 of look-up tables, shown in FIG. 6A, sets forth the low trip points for each operating condition included in each algorithm. The second look-up table 298, shown in FIG. 6B, sets forth the high trip points for each operating condition included in each algorithm. The third look-up table 300, shown in FIG. 6C, sets forth the potential next low operating condition for each operating condition included in each algorithm. The fourth look-up table 302, shown in FIG. 6D, sets forth the potential next high operating condition for each operating condition included in each algorithm.

The terms "low trip point", "high trip point", "potential next low", and "potential next high" may be easily understood by converting an algorithm set forth in the look up tables to graphic form. For purposes of example, algorithm 262, also identified with Roman numeral IX, is set forth in graphic form in FIG. 9A. Algorithm 262 (Engine/CR/>24) in the first set of look-up tables 294 is for return air control of unit 20, when unit 20 is operating with engine 30 as the prime mover, in the continuous run (CR) mode, with the set point above 24° F. (>24), and with no suction line modulation. As shown in each of the four look-up tables 296, 298, 300 and 302, algorithm 262 includes operating conditions high speed cool, not in range (HCN), high speed cool, in range (HCI), low speed cool, in range (LCI), low speed cool, in range, with an 8 minute timer (LCI8), low speed heat, in range (LHI), low speed heat, in range, with an 8 minute timer (LHI8), high speed heat, in range (HHI), and high speed heat, not in range (HHN).

The first look up table 296 establishes a low trip point or temperature error which sets the lower limit for each of the operating conditions, and the third look-up table 300 sets forth the potential next low operating condition for each operating condition. Starting at the top of the graph and moving downwardly along the left-hand side, unit 20 will initially be in HCN during temperature pull down. It will be seen from FIG. 6A that the low trip point for HCN is +5° F. The (+) sign associated with an error value indicates the load temperature is above set point, while a (−) sign indicates the load temperature is below set point. From look-up table 300 in FIG. 6C the potential next low condition for condition HCN will be found to be HCI. Thus, for algorithm 262, the +5 degree error low trip point establishes the boundary limit between conditions HCN and HCI.

In like manner, the low trip point for HCI is set forth in table 296 as +3.5, and the potential next low condition for condition HCI, as set forth in look-up table 300 (FIG. 6C) is LCI. Thus, an error value of +3.5 sets the boundary where the operation of unit 20 changes from HCI to LCI. From table 296 in FIG. 6A, the low trip point for LCI is 0 error, or set point, and the potential next low condition for LCI is LHI, as set forth in table 300 (FIG. 6C). Thus, the selected set point temperature establishes the boundary between LCI and LHI. The low trip point for LHI is an error value of −3.4, and the potential next low condition for LHI is LHI8. If the error drops to −3.4, an 8 minute timer is started, with LHI8 switching to the next potential low condition HHN at the low trip point of −6.8° F. Unit 20 cannot languish in low speed, however, between error values of −3.4 and −6.8, as it will be noted from tables 298 and 302 that the potential next high for LHI8 is LHI at a high trip point of −1.7° F. If LHI8 does not lower the error to −1.7° F. before the 8 minute timer times out, unit 20 will be switched to condition HHN, which switches engine 30 to high speed and greater heating capacity.

Figure 9A:
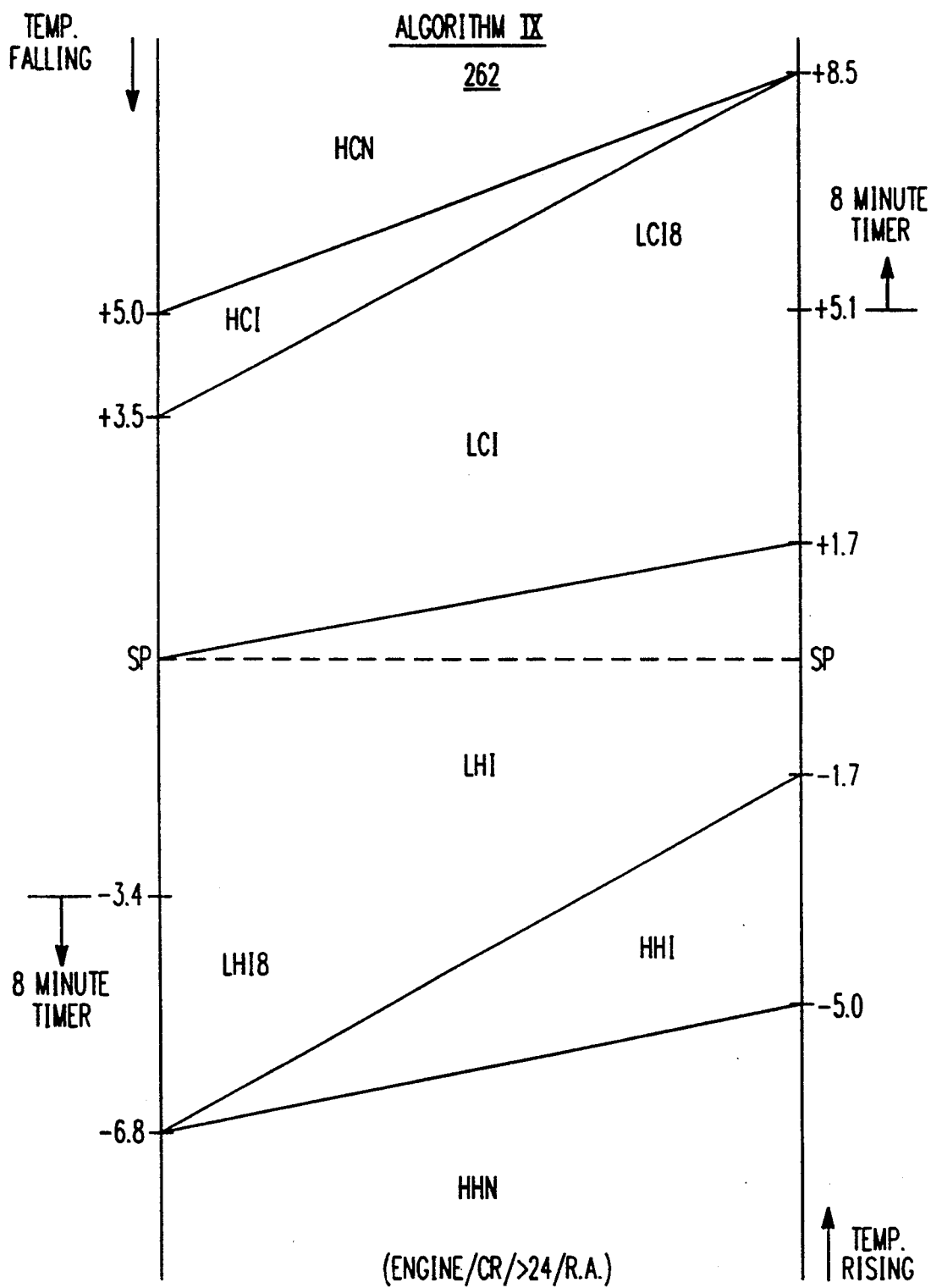
FIGS. 9A and 9B graphically set forth two of the plurality of algorithms set forth in the three sets of look-up tables, illustrating continuous operation of an engine prime mover using return air control, when the selected set point temperature indicates fresh and frozen loads, respectively.

Starting with condition HHN and proceeding upwardly along the right-hand side of graph in FIG. 9A, look-up tables 298 and 302 shown in FIGS. 6B and 6D of the first set 294 of look-up tables will be used to determine potential next high operating conditions, and the associated high trip points. The next potential high for HHN is HHI, and the trip point occurs at an error of −5.0° F. The next potential high for HHI is LHI, with the trip point being at −1.7° F. The next potential high for LHI is LCI, with the trip point between the two conditions being at +1.7° F. The potential next high for LCI is LCI8, with the high trip point for LCI being +5.1° F. The potential next high for LCI8 is HCN, with the high trip point occurring at +8.5° F. Unit 20 cannot languish in low speed between error values +5.1 and +8.5, however, as LCI8 starts an 8 minute timer. The next potential low for LCI8 is LHI and the low trip point is +3.5. Thus, if LHI8 does not lower the error to +3.5 before the 8 minute timer times out, LHI8 goes immediately to the potential next high HCN, causing engine 30 to switch to high speed and greater cooling capacity.

If algorithm 252 is selected, which is similar to algorithm 262 except cycle sentry is selected, it will be noted from look-up table 300 in FIG. 6C that the next potential low for NULLDC is LHI8, so the 8 minute timer is started as soon as engine 30 is started, and the unit will be in low speed for a maximum of 8 minutes. If the error has risen to a value of +1.7° F. before 8 minutes elapses, the unit will switch to high speed. In like manner, the potential next high for NULLDH is LCI8, so the 8 minute timer is started immediately upon a rising temperature out of the null condition, with similar results occurring when going out of a null condition due to a falling temperature.

Figure 9B:
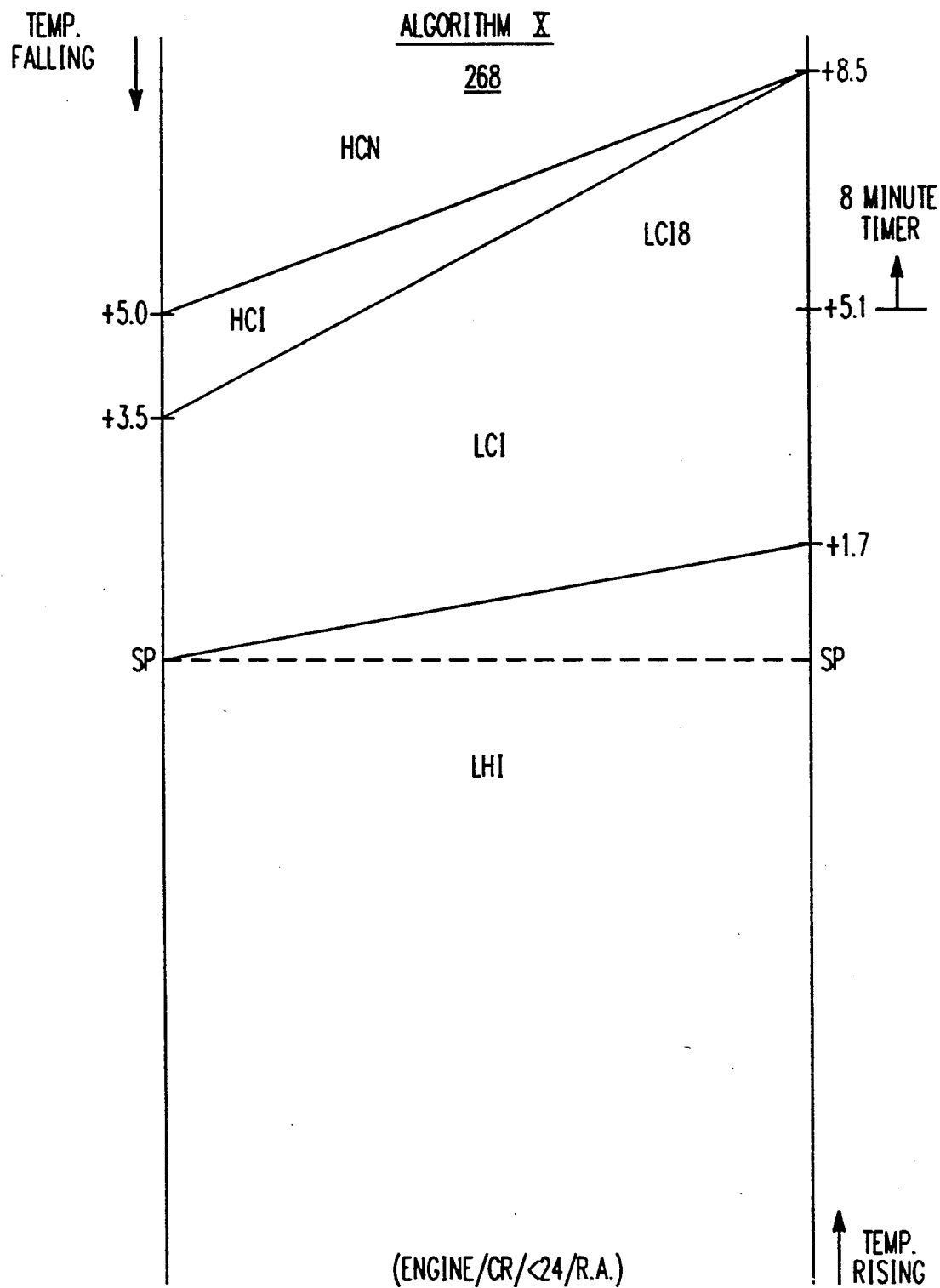

FIG. 9B graphically shows algorithm X (268) with return air control, which is similar to algorithm IX (262) shown in FIG. 9A, except the selected set point temperature indicates a frozen load.

Figure 10A:
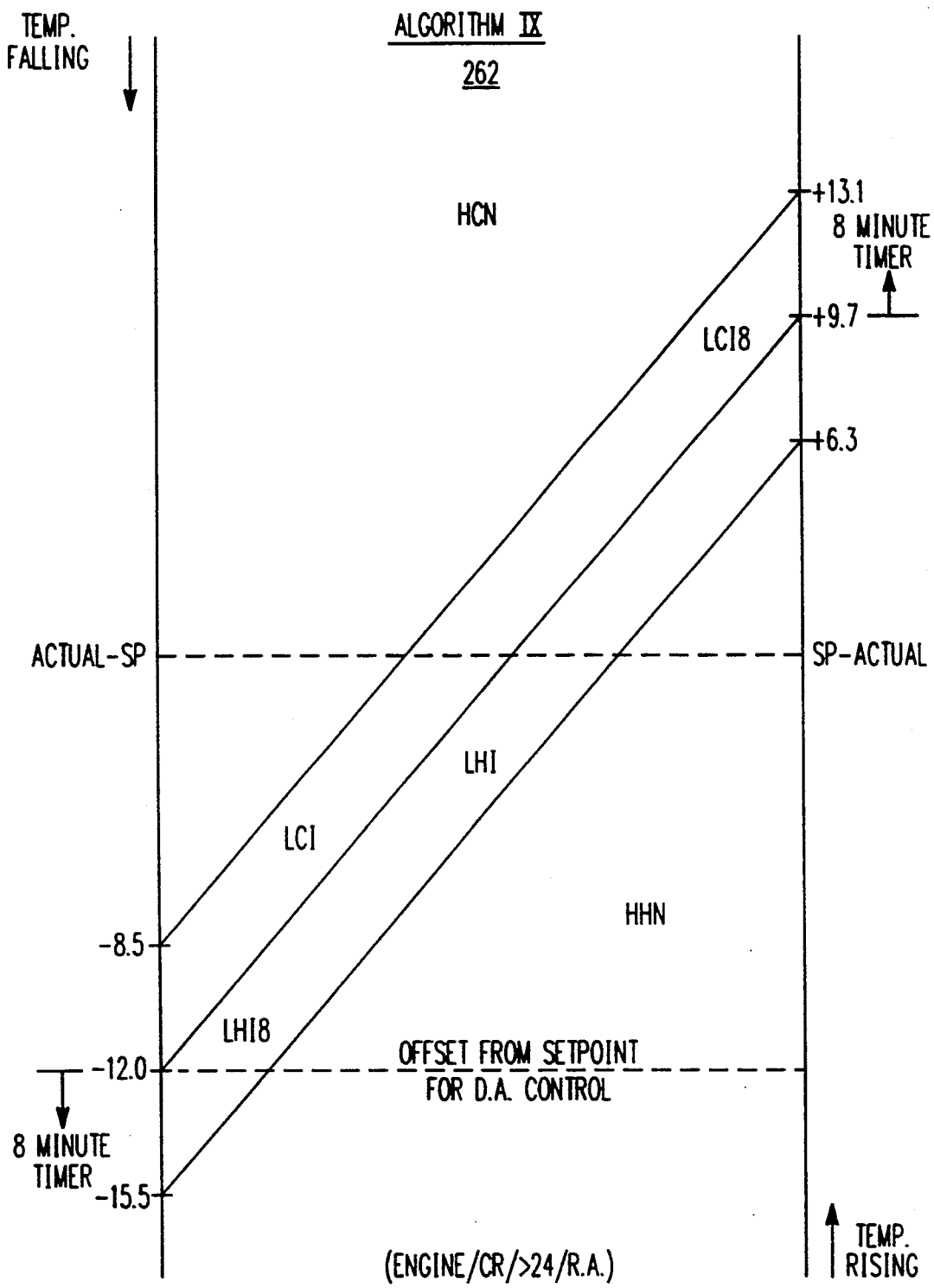
FIGS. 10A and 10B graphically set forth the same two algorithms shown in FIGS. 9A and 9B, illustrating continuous operation of an engine prime mover using discharge air control, when the selected set point temperature indicates fresh and frozen loads, respectively.
Figure 10B:
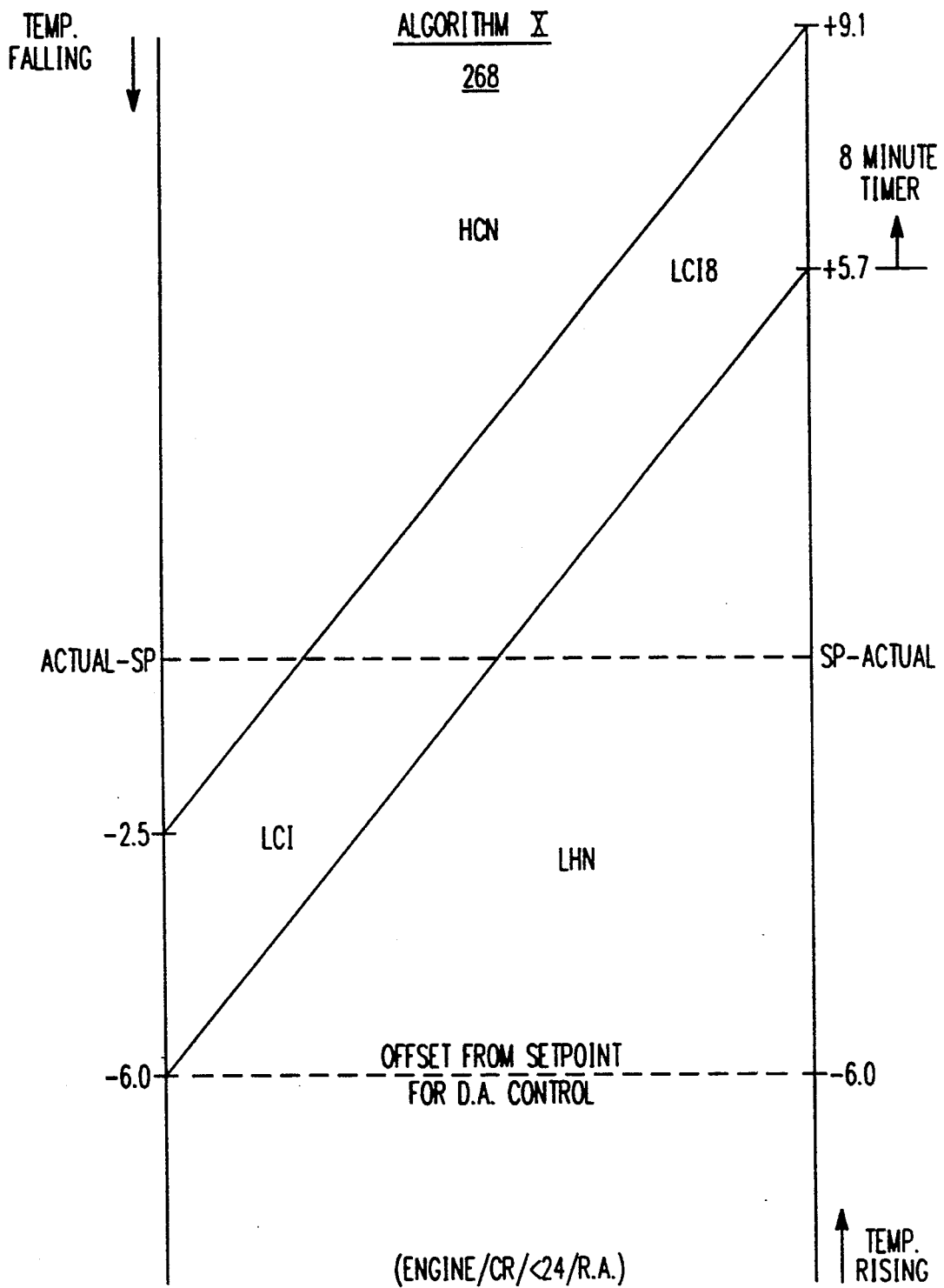

FIGS. 10A and 10B graphically show algorithms IX (262) and X (268), the same algorithms used in the graphs of FIGS. 9A and 9B, except the return air sensor 100 has failed and unit 20 is on discharge air control via discharge air temperature sensor 104. The graphs of FIGS. 10A and 10B were constructed using the second set 304 of look-up tables, which include tables 306, 308, 310 and 312 shown in FIGS. 7A, 7B, 7C and 7D, respectively. In comparing FIGS. 9A and 10A, which set forth algorithm IX graphically for return air and discharge air control, respectively, it will be noted that discharge air control shifts the trip points, and that operating conditions HCI and HHI, used on return air control, are not utilized in algorithm IX when unit 20 is on discharge air control.

In comparing FIGS. 9B and 10B, which set forth algorithm X (268) graphically for return air and discharge air control, respectively, it will be noted that:

(1) discharge air control shifts the trip points from those used in return air control, (2) conditions HCI and LHI used with return air control are not used with discharge air control, and (3) condition LHN used with discharge air control is not used with return air control.

Figure 11A:
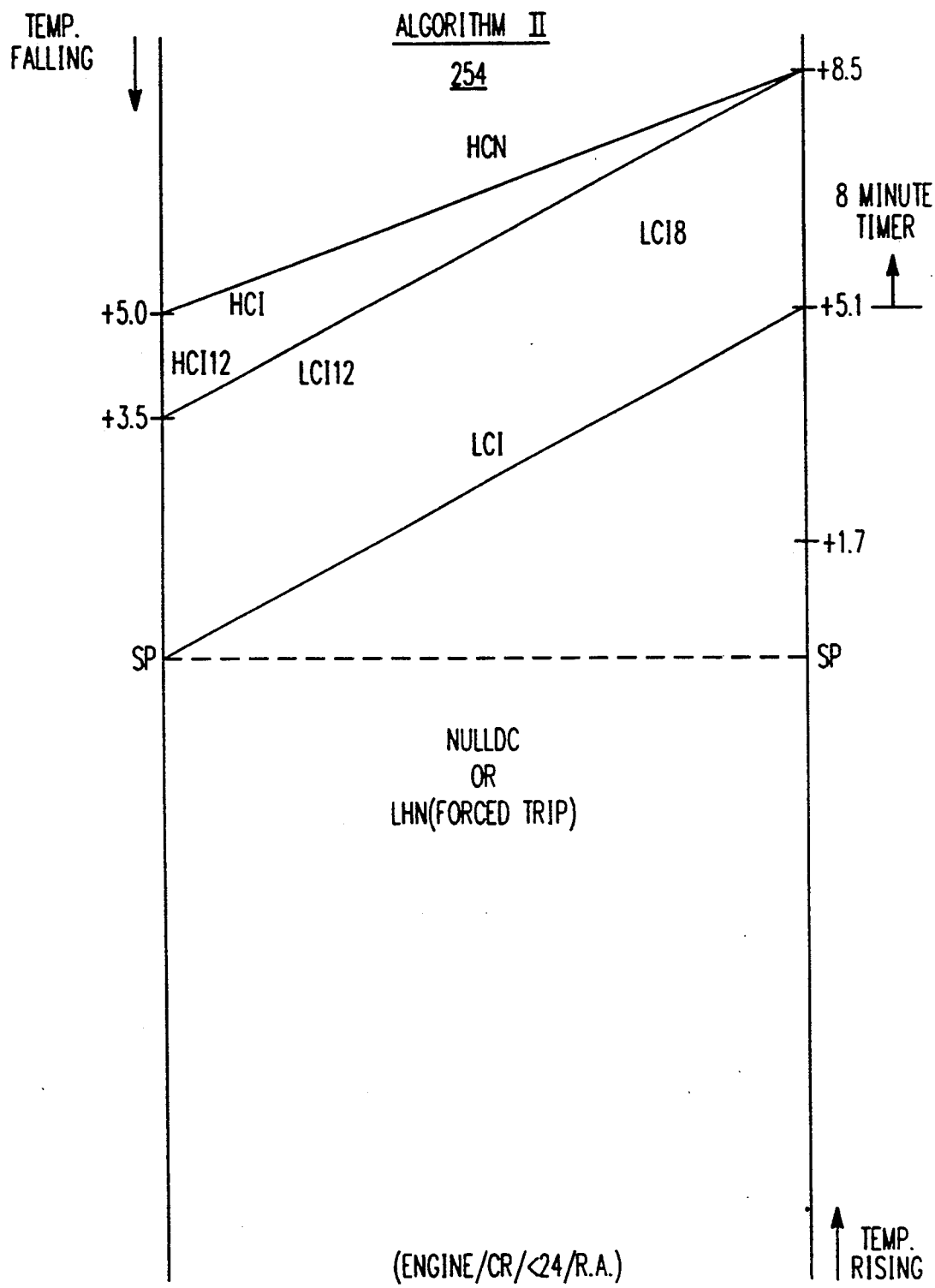
FIGS. 11A and 11B graphically set forth two additional algorithms set forth in the three sets of look-up tables, illustrating cycle sentry operation of an engine prime mover using return air control, when the selected set point temperature indicates frozen and fresh loads, respectively.

FIG. 11A graphically sets forth algorithm II (254), which illustrates cycle sentry operation with a frozen load, on return air control. On pull down, unit 20 starts in HCN, changes to HCI at an error or +5.0° F., and to LCI12 at +3.5° F. LCI12 starts a 12 minute timer. If set point is not reached in 12 minutes, the timing out of the 12 minute timer calls condition HCI12. It will be noted from the low trip point look-up tables 296 and 306 in FIGS. 6A and 7A, respectively, that the low trip point for HCI12 is 0 error or set point with return air control, and an error of $-6.0°$ F. with discharge air control. Thus, once the high speed, in-range mode HCI12 is triggered, unit 20 stays in high speed until NULLDC is reached, insuring that unit 20 does not languish in low speed and unable to reach the null condition.

Once NULLDC is reached, engine 30 will shut down if the engine block temperature, as sensed by sensor 116, and the battery charging current indicates the battery is sufficiently charged. If both conditions are not satisfied, unit 20 will switch to condition LHI, until the engine temperature and battery charge requirements are satisfied. If the load temperature rises to an error value of $+5.1°$ F. on either return or discharge air control, condition LCI8 is initiated which starts an 8 minute timer. If set point, i.e., 0 error, with return air control, or an error of $-6.0$ with discharge air control, are not reached in 8 minutes, unit 20 will switch to HCI and stay in high speed until NULLDC is reached.

Figure 11B:
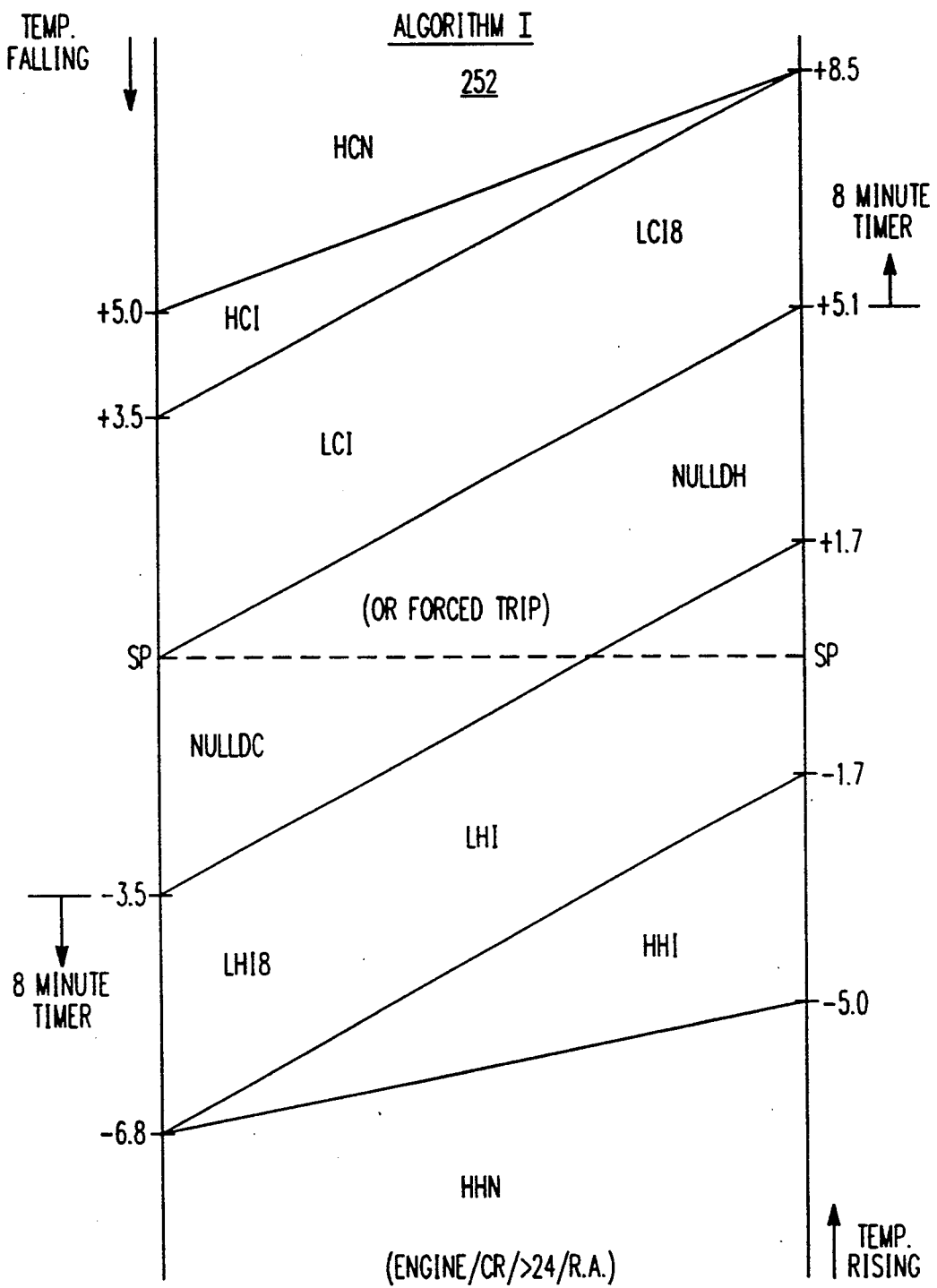

FIG. 11B sets forth Algorithm I (252) graphically, which illustrates cycle sentry operation with a fresh load, on return air control. Eight minute timers are used with engine start upon coming out of a null condition with either a falling or a rising temperature, i.e., condition LHI8 with a falling temperature, and condition LCI8 with a rising temperature, to insure that if the unit capacity in low speed is not great enough to reach set point that engine 30 will stay in low speed for only 8 minutes before switching to high speed. High speed is then used until the load temperature error reaches the null temperature band.

It will be noted that the look-up tables of FIGS. 8A, 8B and 8C have an entry for only the low speed cool, in range condition LCN. When both the return air and discharge air sensors 100 and 104 fail, unit 20 will operate continuously in condition LCN to preserve a frozen load. If set point indicates a fresh load is being conditioned at a time when both the return air and discharge air sensors fail, unit 20 will shut down with an alarm which indicates to the operator the cause of shut down, ie., failure of both the return air sensor and the discharge air sensor.

Figure 12:
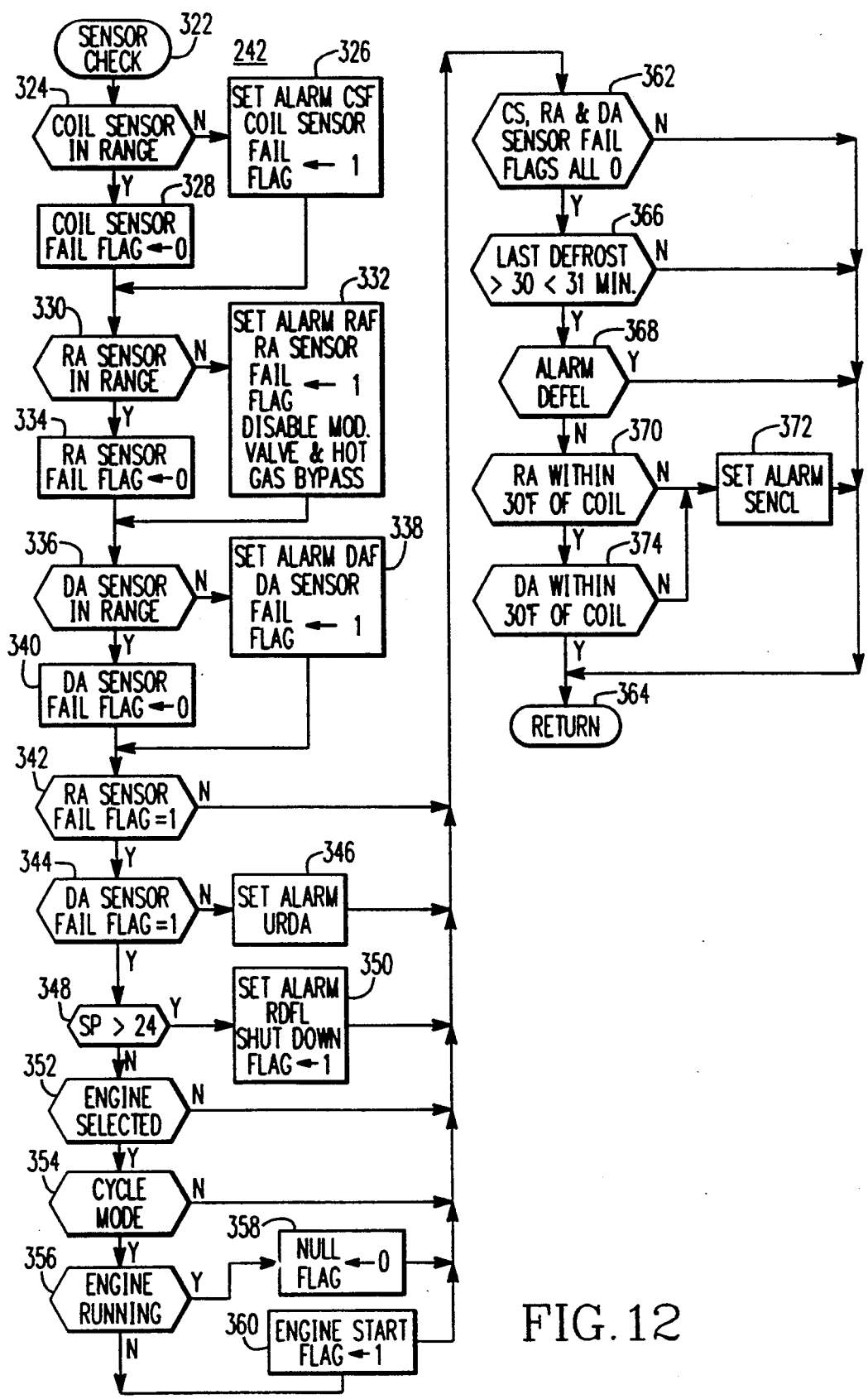
FIG. 12 is a flow chart which sets forth program steps which implement the checking of various sensors used in the transport refrigeration unit.

FIG. 12 is a flow chart which sets forth the sensor check function 242 shown in block form in FIG. 3. Sensor check function 242 is entered at 322 and step 324 checks the input received from evaporator coil sensor 108, comparing the value with a predetermined range of plausible values. If the received value is not within the predetermined range, step 326 sets, alarm CSF to note the failure for diagnostic purposes, and a coil sensor fail flag CSFF is set true. If step 324 finds the received value in range, step 328 sets coil sensor fail flag CSFF false.

In like manner, step 330 checks the value provided by the return air sensor 100. If the value is not in a predetermined range, step 332 sets alarm RAF, it sets a return air sensor fail flag RASFF true, and step 332 also disables the modulation valve 64 and hot gas by-pass valve 188, as they are only used with return air control. If step 330 finds the value of the return air sensor 100 in the proper range, step 334 sets the return air sensor fail flag RASFF false.

In like manner, step 336 checks the value provided by the discharge air sensor 104. If the value is not in a predetermined range, step 338 sets alarm DAF and it sets a discharge air sensor fail flag DASFF true. If step 336 finds the value in the proper range, step 340 sets the discharge air sensor fail flag DASFF false.

Step 342 then checks to see if the return air sensor fail flag RASFF is true. If it is not true, the return air sensor 100 is operating properly and the program immediately advances to a portion of the program to check sensor calibration, as unit 20 normally operates with return air control. If the return air sensor fail flag RASFF is true, then the program enters a portion which determines how unit 20 should operate, now that its usual operating method of return air control can not be used. Step 344 checks to see if the discharge air sensor fail flag DASFF is true. If flag DASFF is not true, the discharge air sensor 104 is operating properly, and since operation with discharge air control is the first back-up for failure of return air sensor 100, the program can advance to the sensor calibration check. Step 346 first sets an alarm URDA, which notifies the operator or maintenance personnel that the unit is running on discharge air control.

If step 344 finds the discharge air sensor 104 has failed, the program continues in the portion which searches for a suitable operating condition. Step 348 checks the selected set point temperature to determine if the load being conditioned in space 90 is fresh or frozen. If step 348 finds a fresh load, i.e., the set point temperature is above 24° F., then step 350 sets an alarm RDFL which indicates both the return air sensor and the discharge air sensor have failed, and a shutdown flag SDF is set true, to indicate to mode decision program 232 that unit 20 should be shut down. Since unit 20 will not be operated further, the portion of program 242 devoted to finding an operating condition for unit 20 may now be exited for the sensor calibration portion.

If step 348 finds the set point indicates a frozen load, unit 20 may still be operated according to the teachings of the invention, in a continuous low speed cool, not-in-range condition (LCN). Step 352 checks the input from prime mover selector 35 to see if engine 30 has been selected. If the electric motor 32 has been selected, the program goes to the calibration portion. If engine 30 is the prime mover, step 354 checks to see if cycle sentry operation has been selected. If the cycle mode has been selected, step 356 determines if engine 30 is running. If it is running, step 358 sets a null flag NF to 0, indicating that the engine should not stop. If step 356 finds engine 30 stopped, step 360 sets the engine start flag ESF true, and engine 30 will be started during the running of mode decision function 232.

The calibration portion of program 242 starts with step 362 which checks to see if the coil sensor 108, return air sensor 100 and discharge air sensor 104 are all in their correct operating ranges. If their fail flags are not all false, then the calibration check cannot be made, and the program exits at 364. If the fail flags are 0 (false) for all three sensors, then step 366 checks to make sure that the temperature of the evaporator coil 62 is not elevated due to a recent defrost operation, such as by insuring that it has been about 30 minutes since the last defrost. Step 368 checks to make sure that an alarm DEFEL has not been set, which indicates that defrost time has elapsed and the evaporator coil 62 should be defrosted. If steps 366 and 368 are not satisfied, then a reliable sensor calibration check cannot be made, and the program exits at 364. If steps 366 and 368 are both satisfied, step 370 checks to see if the return air sensor 100 is within 30 degrees of the coil sensor 108. If it is, step 374 does the same for the discharge air sensor 104, checking its value versus the value of coil sensor 108. If both steps 370 and 374 are satisfied, program 242 exits at 364. If either of steps 370 or 374 are not satisfied, step 372 sets an alarm SENCL which indicates to maintenance personnel that the sensors require calibration.

As an example of how the teachings of the invention are implemented, the "continuous" mode 238 of operating unit 20, shown in block form in FIG. 3, is set forth in detail in FIG. 13. Program 238 for the continuous-run operating mode is entered at 376 and step 378 de-energizes the run relay 158, as on continuous-run operation relay 158 is de-energized. Step 380 checks to see if the prime mover 28 is running. If prime mover 28 is not running, step 382 updates a unit-not-running timer UNRT which is cleared and started by real time case select function 230 during initialization. If timer UNRT has not reached 5 minutes, program 238 exits at 386, as the operator has 5 minutes to start unit 20 after turning on the control 98. If step 384 finds timer UNRT has reached 5 minutes, step 388 sets the shutdown flag SDF true, and step 390 sets an alarm ENRUN to indicate that the prime mover 28 is not running.

If step 380 finds prime mover 28 running, step 392 checks to see if the condition flag CF has been initialized. If condition flag CF is not initialized, it means unit 20 has just been turned on, and step 394 checks the temperature of the load versus the selected set point temperature to determine whether unit 20 should be started in a cooling cycle or in a heating cycle. If the temperature of the load in space 90 is higher than set point, a cooling cycle is required and step 396 sets condition flag CF to #4, which, as shown in FIG. 5, selects the low speed cool, not-in-range operating condition LCN. If the temperature in the load space 90 is not higher than set point, heating is required and step 398 sets condition flag CF to #13, which, as shown in FIG. 5, selects the low speed heat, not-in-range operating condition LHN.

Step 400 then runs a program entitled "potential and trip point decision", which will be hereinafter described in detail relative to FIG. 14. Step 402 then runs the program "condition case" shown in FIG. 5, to select an operating condition for unit 20 according to the number assigned to condition flag CF. Step 404 sets timer UNRT to 0, and the program exits at 386.

If condition flag CF has been initialized, step 392 proceeds to step 406 to see if modulation jumper 206 is in position, by checking a modulation valve present flag MVPF to see if it is true. This flag is set true by real time case select function 230 shown in FIG. 3 when modulation jumper 206 is detected during initialization. If flag MVPF is not true, step 408 sets a modulation valve flag MVF false, and the program continues to the hereinbefore described steps 400, 402 and 404. If step 406 finds modulation jumper 206 is in position, step 410 checks to see if suction line modulation should be utilized with the present setting of the set point temperature, i.e., suction line modulation is not used with a frozen load. If step 410 finds the set point temperature is higher than 24° F., step 412 sets modulation valve flag MVF true, to indicate suction line modulation should be used, and the program goes to step 400. If step 410 finds a frozen load in space 90, step 408 sets the modulation valve flag MVF false, and the program goes to step 400.

FIG. 5 sets forth function 402 of FIG. 13 in detail, with a program 402 for the condition case function being entered at 414. Step 416 fetches the condition flag CF and step 418 determines the number currently assigned to it. From the number of the condition flag CF, step 420 determines which of the 19 operating condition programs to run. Step 422 runs the selected program, and program 402 exits at 424. An exemplary program for implementing step 422 is set forth in FIG. 15. Before the selected operating program is run, however, a potential and trip point program 400 corresponding to step 400 of FIG. 13 is run to load the proper trip point values, next potential low operating conditions, and next potential high operating conditions, for the current algorithm as selected by FIG. 4, for the current sensor operating mode, as determined by FIG. 12.

Figure 14:
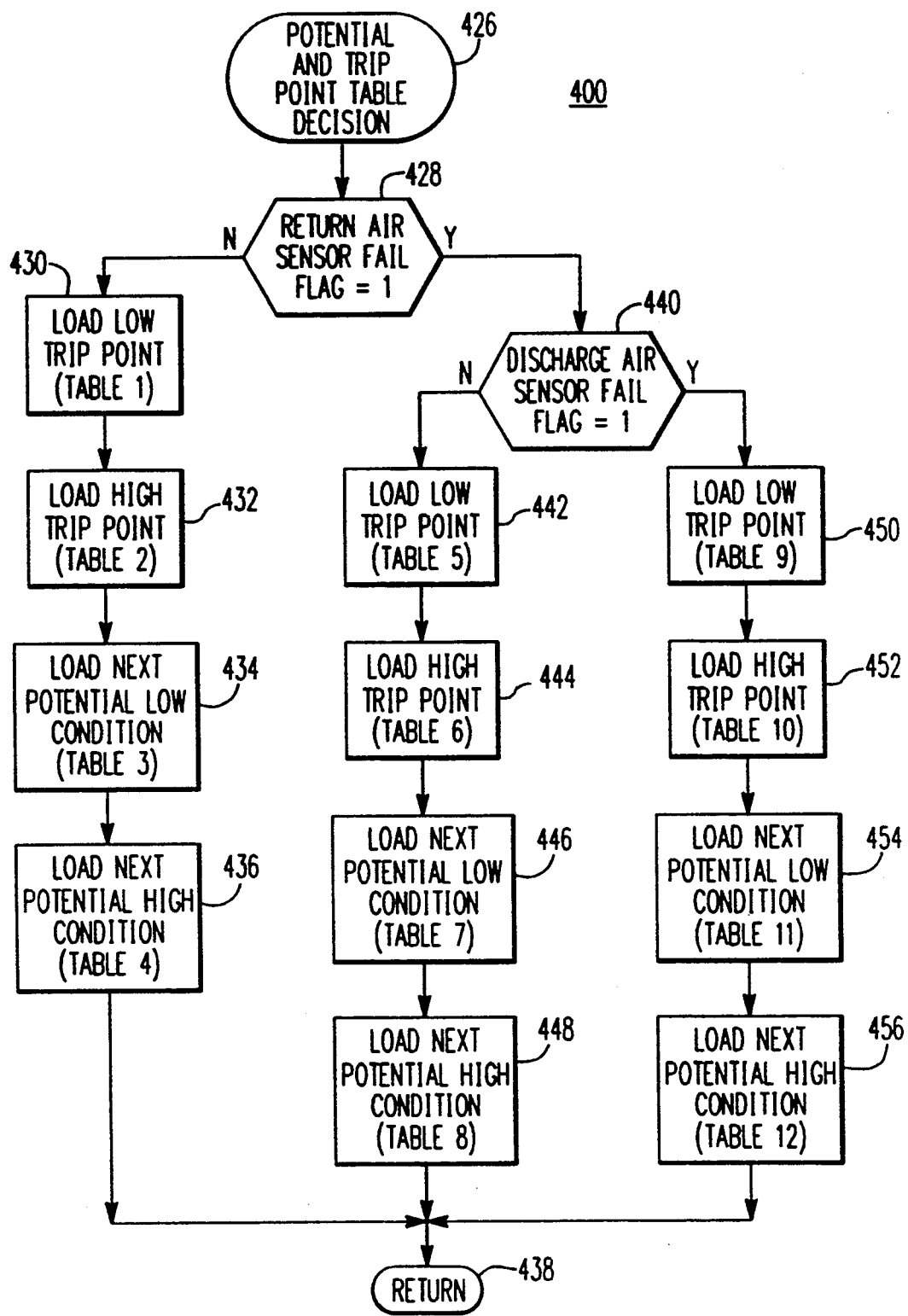
FIG. 14 is a flow chart which implements one of the steps of the flow chart shown in FIG. 11.

A program 400 for the "potential and trip point decision" shown in block form at step 400 in FIG. 13 is shown in detail in FIG. 14. The potential and trip point decision program 400 is entered at 426 and step 428 checks the return air sensor fail flag RASFF to see if it is true. If it is false, indicating the return air sensor 100 is functional, then the look-up tables associated with return air control are loaded into the portion of microprocessor memory (RAM 124) which will be accessed by other programs.

More specifically, step 430 obtains look-up table 296 shown in FIG. 6A, associated with the low trip points for the various operating conditions of each algorithm when operating with return air control, from ROM 122, and step 430 also loads it into RAM 124. In like manner step 432 loads look-up table 298 shown in FIG. 6B, associated with high trip points, step 434 loads look-up table 300 shown in FIG. 6C, associated with next potential low operating conditions, and step 436 loads look-up table 302 shown in FIG. 6D, associated with next potential high operating conditions. The program exits at 438.

If step 428 finds the return air sensor fail flag RASFF true, step 440 determines if the discharge air sensor is functional by checking flag DASFF. If flag DASFF indicates discharge air sensor 104 is functional, steps 442, 444, 446 and 448 respectively load look-up tables 306, 308, 310 and 312 shown in FIGS. 7A, 7B, 7C and 7D into RAM 124. If step 440 finds the discharge air sensor fail flag DASFF true, then steps 450, 452, 454 and 456 respectively load look-up tables 316, 318, and 320 shown in FIGS. 8A, 8B and 8C into RAM 124, with FIG. 8C containing the look-up tables for potential next low conditions and potential next high conditions.

Figure 15:
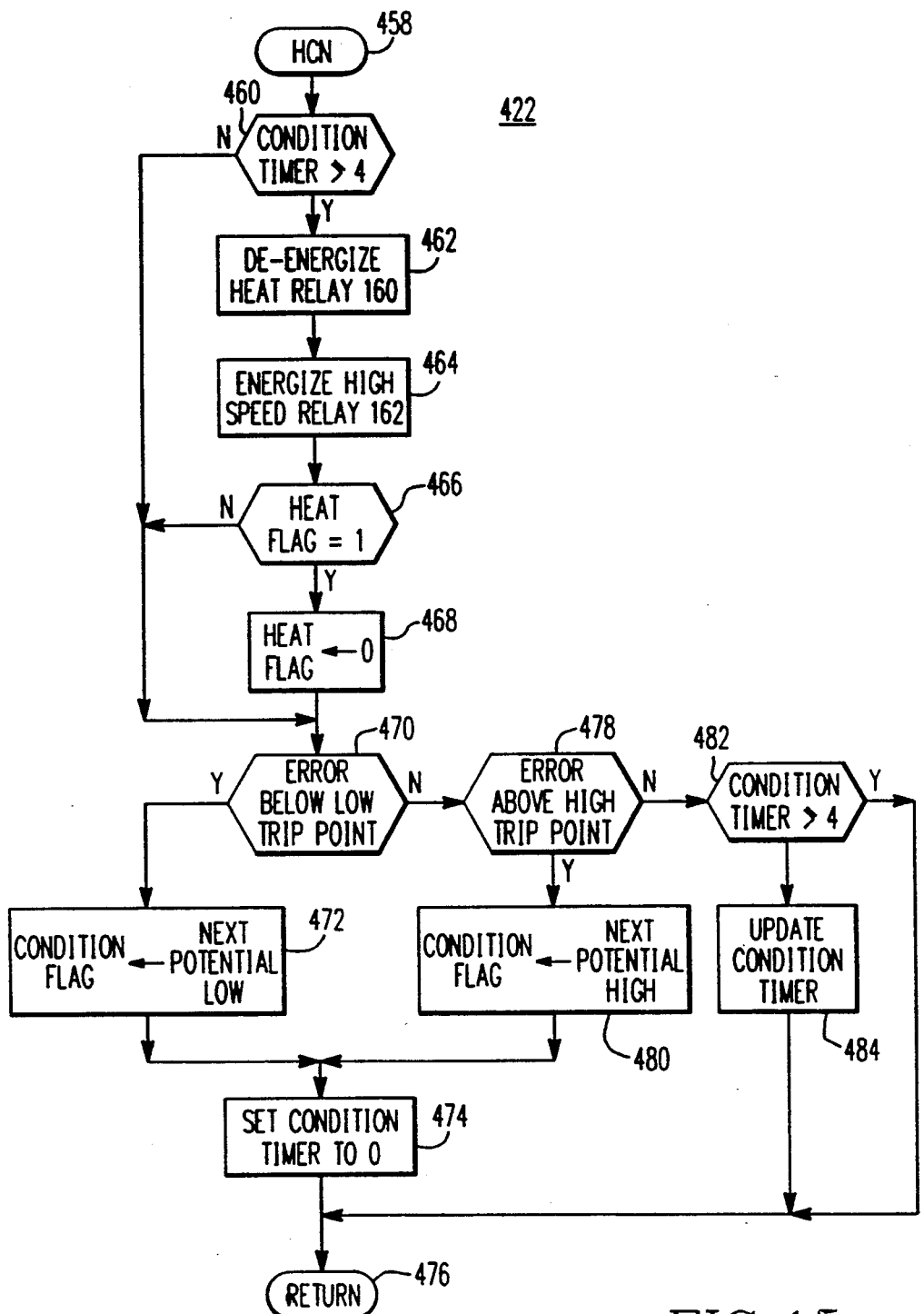
FIG. 15 is a flow chart which sets forth a program for implementing one of the conditions of a control algorithm.

FIG. 15 sets forth an exemplary program 422 for implementing step 422 shown in FIG. 5, which, for purposes of example selects the high speed cool, not in range operating program HCN. All of the 19 programs shown in block 420 of FIG. 5 perform functions relative to the use of the look-up tables which are similar to HCN and thus the other 18 programs need not be described in detail.

Program 422 is entered at 458 and step 460 checks a condition timer CT to see if it has exceeded a predetermined period of time, such as 4 seconds. Condition timer CT is started each time a new operating condition is initiated, to make sure that it runs at least for the predetermined period of time. If the condition timer CT indicates the current operating condition has existed for at least 4 seconds, step 464 de-energizes heat relay 160, since HCN is a cooling mode and heat relay 160 must be de-energized to de-energize pilot solenoid PS and select a cooling cycle for unit 20.

Step 464 then energizes high speed relay 162 to close its contacts 178 and energize high speed solenoid 120, which selects the high speed throttle setting of engine 30, since HCN is a high speed engine-related operating mode. Step 466 checks a heat flag HF to see it has been set true by a program associated with a prior operating condition, and if it is true, step 468 sets it false to indicate the present operating condition is a cooling cycle. Step 468 then goes to step 470, as do the "no" branches from steps 460 and 466.

Step 470 then obtains the low trip point from the low trip point look-up table currently stored in RAM 124, ie., table 296 for return air control, table 306 for discharge air control, and table 316 for "no sensor" control, and step 470 checks to see if the error between the load temperature and set point is below the low trip point. If the error is below the low trip point, step 472 obtains the next potential low for HCN from the look-up table currently in RAM 124 which is associated with the next potential low, i.e., table 300 with return air control, table 310 with discharge air control, and table 320 with "no sensor" control. Step 472 then sets the number of the condition flag CF to correspond to the next potential low obtained from the appropriate look-up table. Step 474 sets the condition timer CT to 0 and the program exits at 476.

If step 470 finds the error is not below the low trip point, step 478 obtains the high trip point for HCN from the look-up table currently in RAM 124 associated with the high trip points, and determines if the error between load temperature and set point is above the high trip point. If it is, step 480 obtains the next potential high operating condition relative to HCN from the proper look-up table currently stored in RAM 124, and step 480 then sets condition flag CF to the number which corresponds to the next potential high operating condition for HCN.

If step 478 finds the error is not above the high trip point, the load temperature is thus still in the proper temperature range for HCN, and step 478 goes to step 482 to see if the condition timer CT has reached the predetermined time value, e.g., 4 seconds. If it has not, step 484 updates the condition timer CT and the program exits at 476. If the condition timer CF has reached 4 seconds the program exits at 476.

I claim:

1. A method of operating a transport refrigeration unit to condition the air of a load space to a selected set point temperature, with the unit having a refrigerant compressor driven by a prime mover, return air and discharge air temperature sensors, and a plurality of control algorithms each comprised of predetermined unit operating conditions, comprising the steps of:
   providing a first set of look-up tables associated with return air control;
   providing a second set of look-up tables associated with discharge air control,
   providing a third set of look-up tables,
   providing a plurality of look-up tables in each of said first, second and third sets of look-up tables, with said plurality of look-up tables defining low and high trip points for each operating condition, and the next potential low and the next potential high operating conditions for each operating condition, of each of the plurality of algorithms,
   detecting the conditions of the return air and discharge air sensors,
   using the first set of look-up tables when the detecting step indicates the return air sensor is functional,
   using the second set of look-up tables when the detecting step indicates the return air sensor is not functional and the discharge air sensor is functional,
   and using the third set of look-up tables when the detecting step indicates both the return air and discharge air sensors are not functional.

2. The method of claim 1 including the step of detecting whether the selected set point temperature indicates a fresh or a frozen load, with the step of using the third set of look-up tables when the return air and discharge air sensors are not functional being utilized only when the detecting step finds the set point temperature indicates a frozen load, and including the step of shutting the unit down when the return air and discharge air sensors are not functional and the set point temperature indicates a fresh load.

3. The method of claim 2 including the step of providing an alarm when the second set of look-up tables are used, which indicates the unit is operating with the discharge air sensor.

4. The method of claim 2 including the step of providing an alarm when the unit is shut down, which indicates the cause of shutdown is the failure of both the return air and discharge air sensors.

5. The method of claim 2 wherein the prime mover is selectably operable in a continuous mode or in a cycling mode, and including the step of operating the prime mover in the continuous mode when the third set of tables is utilized, notwithstanding the selection of the cycling mode.

6. The method of claim 1 wherein the prime mover is selectably operable in a continuous mode or in a cycling mode, and including the step of operating the prime mover in the continuous mode when the third set of tables is utilized, notwithstanding the selection of the cycling mode.

7. The method of claim 1 wherein the prime mover of the transport refrigeration unit is selectably operable in a continuous mode or in a cycling mode, with or without suction line modulation, and including the steps of:
   providing a first signal indicating the type of prime mover,
   providing a second signal which indicates whether the prime mover is to be operated in a continuous mode or in a cycling mode,
   providing a third signal responsive to the selected set point temperature which indicates whether the load is fresh or frozen,
   providing a fourth signal which indicates whether suction line modulation is to be utilized,
   and using the first, second, third and fourth signals to select one of the plurality of control algorithms.

8. The method of claim 7 including the step of using the selected control algorithm to access the selected set of look-up tables.

9. The method of claim 1 including the steps of:
   providing first, second, third and fourth look-up tables in each of the first, second and third sets of look-up tables, defining low and high trip points in the first and second look-up tables, respectively, and defining the next potential low operating condition and the next potential high operating condition, for each operating condition, in the third and fourth look-up tables, respectively.

* * * * *